(12) United States Patent
Clifford

(10) Patent No.: US 11,896,866 B2
(45) Date of Patent: Feb. 13, 2024

(54) CLAMP DEVICE FOR BEING SECURED TO A BAR

(71) Applicant: WINFORD LLC, Brooklyn Park, MN (US)

(72) Inventor: Jason Clifford, Brooklyn Park, MN (US)

(73) Assignee: WINFORD LLC, Brooklyn Park, MN (US)

( * ) Notice: Subject to any disclaimer, the term of this patent is extended or adjusted under 35 U.S.C. 154(b) by 167 days.

(21) Appl. No.: 17/771,029

(22) PCT Filed: Oct. 19, 2020

(86) PCT No.: PCT/US2020/056305
§ 371 (c)(1),
(2) Date: Apr. 22, 2022

(87) PCT Pub. No.: WO2021/080914
PCT Pub. Date: Apr. 29, 2021

(65) Prior Publication Data
US 2022/0362619 A1 Nov. 17, 2022

Related U.S. Application Data

(60) Provisional application No. 62/924,470, filed on Oct. 22, 2019.

(51) Int. Cl.
*A63B 21/072* (2006.01)
(52) U.S. Cl.
CPC .................. *A63B 21/0728* (2013.01)
(58) Field of Classification Search
CPC ............................ A63B 21/072–075
See application file for complete search history.

(56) References Cited

U.S. PATENT DOCUMENTS 3,726,522 A * 4/1973 Silberman .......... A63B 21/0728
403/356
4,639,979 A 2/1987 Polson
(Continued)

FOREIGN PATENT DOCUMENTS

WO WO-2011081209 A1 * 7/2011 ................ F16B 2/16

OTHER PUBLICATIONS

Written Opinion of the International Searching Authority and International Search Report for International Application No. PCT/US20/56305, dated Feb. 26, 2021.

*Primary Examiner* — Nyca T Nguyen
(74) *Attorney, Agent, or Firm* — MARSHALL, GERSTEIN & BORUN LLP; Michael P. Furmanek

(57) ABSTRACT

A clamp device for being secured to a bar includes an outer sleeve having an inner surface defining an annular recess and an inner sleeve received by the outer sleeve having a channel that extends between an inner and outer surface of the inner sleeve. A resilient ring and a rigid ring are disposed within the channel of the inner sleeve. The outer sleeve is axially movable relative to the inner sleeve between a first position and a second position. In the first position, the annular recess is axially aligned with the channel and the rigid member is disposed in the annular recess. In the second position, the annular recess is axially displaced from the channel such that the outer sleeve displaces the rigid member and the resilient ring axially away from the outer sleeve thereby compressing the clamp device to the bar received by the inner sleeve.

20 Claims, 23 Drawing Sheets

(56) References Cited

U.S. PATENT DOCUMENTS

| | | | |
|---|---|---|---|
| 4,893,810 A | 1/1990 | Lee | |
| 4,955,603 A * | 9/1990 | Becker | A63B 21/0728 403/259 |
| 5,062,631 A | 11/1991 | Dau et al. | |
| 5,163,887 A | 11/1992 | Hatch | |
| 5,295,933 A | 3/1994 | Ciminski et al. | |
| 5,295,934 A | 3/1994 | Collins et al. | |
| 5,591,109 A | 1/1997 | Strnad | |
| 6,007,268 A | 12/1999 | Whittington et al. | |
| 6,059,700 A | 5/2000 | Ellenburg | |
| 7,513,856 B2 | 4/2009 | Jones | |
| 10,195,476 B2 * | 2/2019 | Jennings | A63B 21/075 |
| 10,240,647 B2 * | 3/2019 | Iossifidis | F16D 63/008 |
| 2008/0287271 A1 | 11/2008 | Jones | |
| 2014/0256521 A1 * | 9/2014 | Davies, III | A63B 21/0728 482/107 |
| 2015/0231441 A1 * | 8/2015 | Davies, III | A63B 21/0728 482/107 |
| 2016/0193494 A1 | 7/2016 | Roepke | |
| 2017/0135428 A1 * | 5/2017 | Beckman | A43B 11/00 |
| 2017/0151460 A1 * | 6/2017 | Jennings | A63B 21/0728 |

* cited by examiner

CLAMP DEVICE FOR BEING SECURED TO A BAR

CROSS-REFERENCE TO RELATED APPLICATION

This is the United States National Phase of International Patent Application No. PCT/US2020/056305, filed Oct. 19, 2020, which claims priority to U.S. Provisional Patent Application No. 62/924,470, filed Oct. 22, 2019, the entire contents of each of which being hereby incorporated by reference herein.

FIELD OF THE DISCLOSURE

The present disclosure generally relates to clamps and, more particularly, to barbell clamps.

BACKGROUND

Clamps come in a variety of shapes and sizes, and can be used for a variety of activities. For example, one type of a clamp is a barbell clamp. The barbell clamp is a piece of workout equipment that is commonly used to retain one or more weighted plates on a bar. Barbell clamps advantageously secure the one or more weighted plates to the bar ensuring the safety of the user(s) of the bar with one or more weighted plates and individuals around the user. Without barbell clamps, any imbalance in the bar could cause the one or more weighted plates to slide off the bar and potentially injure the user or individuals near the user.

SUMMARY

In accordance with a first exemplary aspect of the present disclosure, a clamp device for being secured to a bar is provided. The clamp device includes an outer sleeve with a generally annular body having an outer circumferential surface and an inner circumferential surface that defines an annular recess, and an inner sleeve that has a generally annular body and is received by the outer sleeve. The inner sleeve has an outer circumferential surface, an inner circumferential surface, and a channel that extends through the inner sleeve between the outer circumferential surface and the inner circumferential surface. A resilient ring is disposed within the channel adjacent the inner circumferential surface of the inner sleeve and at least one rigid member is disposed within the channel adjacent to the outer circumferential surface of the inner sleeve.

In accordance with the first exemplary aspect, the outer sleeve is axially movable relative to the inner sleeve between a first position and a second position. In the first position, the annular recess of the outer sleeve is axially aligned with the channel of the inner sleeve and the at least one rigid member is disposed in the annular recess of the outer sleeve. In the second position, the annular recess of the outer sleeve is axially displaced from the channel in the inner sleeve such that the inner circumferential surface of the outer sleeve displaces the at least one rigid member in a radial direction away from the outer sleeve to urge at least a portion of the resilient ring toward the inner circumferential surface of the inner sleeve such that when the clamp device is positioned on a bar, the bar resides within an opening defined by the inner circumferential surface of the inner sleeve, and the outer sleeve and the at least one rigid member compress the resilient ring against the bar to secure the clamp device in place.

In accordance with a second aspect of the present disclosure, a clamp device for being secured to a bar is provided. The clamp device includes an outer sleeve and an inner sleeve received by the outer sleeve. The outer sleeve has a generally annular body, an outer circumferential surface, and an inner circumferential surface. The inner circumferential surface defines an annular recess, a first ramped surface that continuously extends from a first end of the outer sleeve toward the annular recess, and a second ramped surface that continuously extends from a second end of the outer sleeve toward the annular recess. The inner sleeve has a generally annular body, an outer circumferential surface, and an inner circumferential surface that has a first channel and a second channel. A resilient ring is disposed in the first channel and at least one rigid member is disposed in the second channel.

In accordance with the second exemplary aspect, the outer sleeve is axially movable relative to the inner sleeve between a first position and a second position. In the first position, the annular recess of the outer sleeve is axially aligned with the first and second channels. In the second position, the annular recess of the outer sleeve is axially displaced from the first and second channels of the inner sleeve such that the inner circumferential surface of the outer sleeve displaces the at least one rigid member in a radial direction away from the outer sleeve to urge at least a portion of the resilient ring toward the inner circumferential surface of the inner sleeve, such that when the clamp device is positioned on a bar, the bar resides within an opening defined by the inner circumferential surface of the inner sleeve, and the outer sleeve and the at least one rigid member compress the resilient ring against the bar to secure the clamp device in place.

In accordance with a third exemplary aspect of the present disclosure, a clamp device for being secured to a bar is provided. The clamp device includes an outer sleeve and an inner sleeve received by the outer sleeve. The outer sleeve has a generally annular body, an outer circumferential surface, and an inner circumferential surface that defines a first annular recess and a second annular recess. The inner sleeve has a generally annular body, an outer circumferential surface, an inner circumferential surface, a first channel extending through the inner sleeve between the outer circumferential surface and the inner circumferential surface, and a second channel extending through the inner sleeve between the outer circumferential surface and the inner circumferential surface. A first resilient ring is disposed within the first channel adjacent the inner circumferential surface of the inner sleeve. At least one rigid member is disposed within the first channel adjacent the outer circumferential surface of the inner sleeve and a second resilient ring is disposed within the second channel.

In accordance with the third exemplary aspect, the outer sleeve is axially moveable relative to the inner sleeve between a first position and a second position. In the first position, the first annular recess of the outer sleeve is axially aligned with the first channel of the inner sleeve and the at least one rigid member is disposed within the first annular recess of the outer sleeve. In the second position, the annular recess of the outer sleeve is axially displaced from the first channel in the inner sleeve such that the inner circumferential surface of the outer sleeve displaces the at least one rigid member a first distance in a radial direction away from the outer sleeve to urge at least a portion of the resilient ring toward the inner circumferential surface of the inner sleeve such that when the clamp device is positioned on a bar, the bar resides within an opening defined by the inner circumferential surface of the inner sleeve, and the outer sleeve and the at least one rigid member compress the resilient ring against the bar to secure the clamp device in place. Further, the second resilient ring is sized such that when the outer sleeve is in the second position, the second resilient ring prevents movement between the second position and the first position.

BRIEF DESCRIPTION OF THE DRAWINGS

The above needs are at least partially met through provision of the clamp device for being secured to a bar as described in the following detailed description, particularly when studied in conjunction with the drawings, wherein.

DETAILED DESCRIPTION

Figure 1:
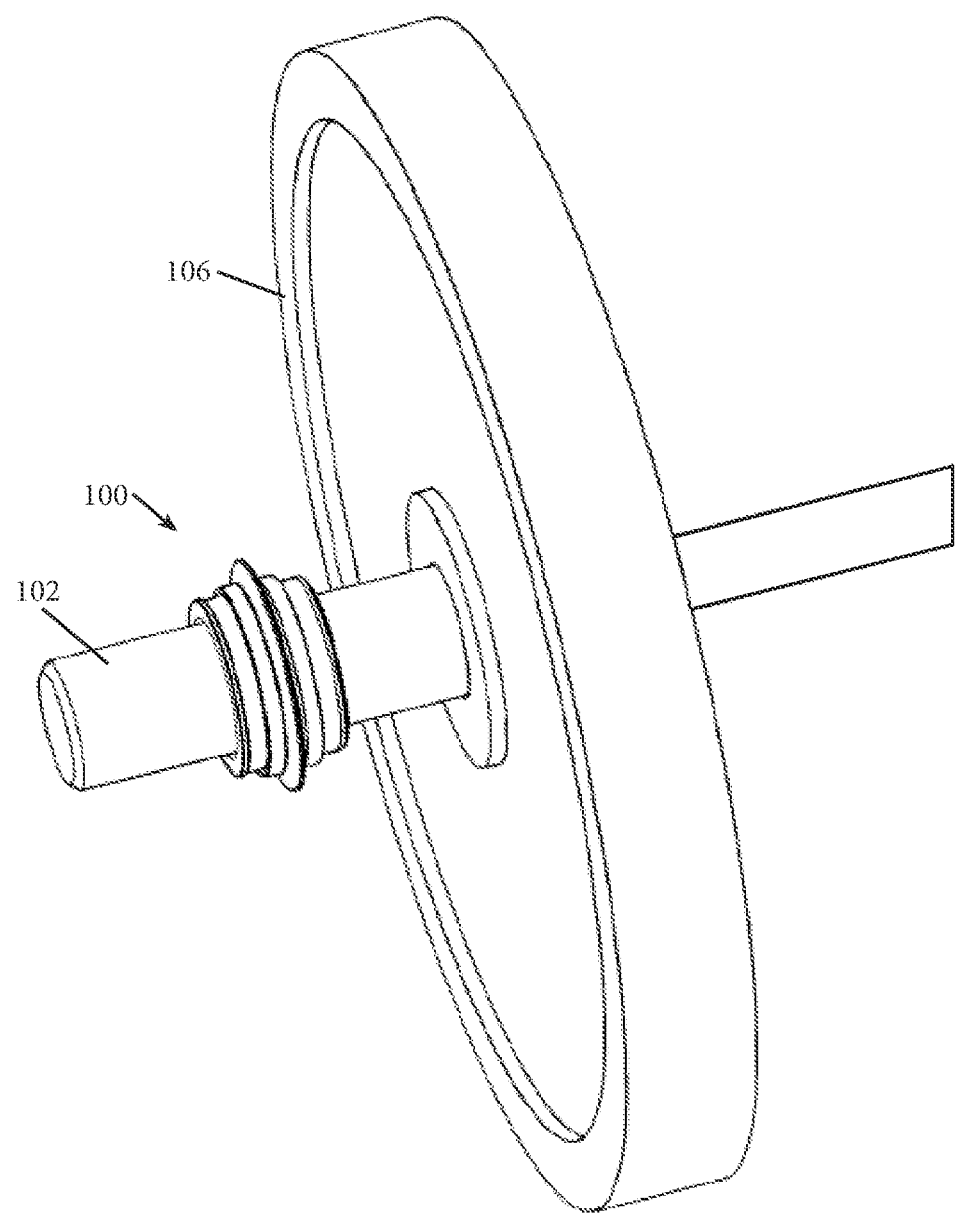
FIG. 1 depicts an embodiment of a clamp device, constructed in accordance with the present disclosure, slidably disposed on a bar in a released position.
Figure 2:
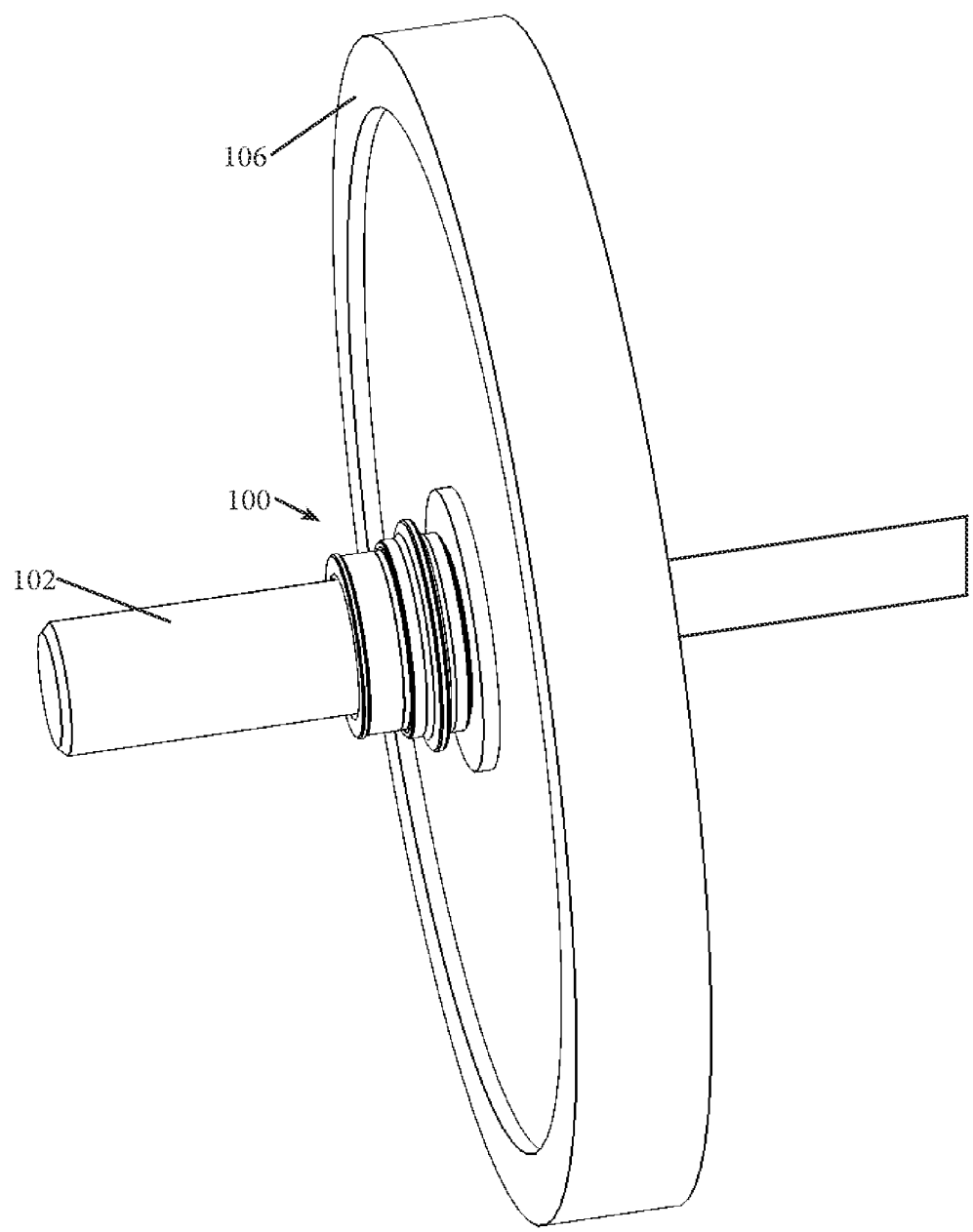
FIG. 2 depicts an embodiment of a clamp device, constructed in accordance with the present disclosure, slidably disposed on a bar in a secured position.

The present disclosure is generally directed to a clamp device, and more specifically, to a barbell clamp that is easily slid onto and secured to a bar (e.g., a barbell), and includes an outer sleeve and an inner sleeve received by the outer sleeve. To secure the clamp device to the bar, the clamp device is first slid onto an end of the bar to a desired position on the bar (e.g., abutting a weight on the bar), as illustrated in FIG. 1. Once the barbell clamp is slid against a weight disposed on the bar, as illustrated in FIG. 2, the outer sleeve is axially translated toward either end of the inner sleeve until the outer sleeve abuts a stopper disposed on either end of the inner sleeve. At this point the clamp device is secured to the bar. To remove the clamp device from the bar, the outer sleeve is axially translated away from the end of the inner sleeve and toward a central portion of the inner sleeve.

FIGS. 1 and 2 illustrate an example clamping device 100 slidably attached to a bar 102 having a weight 106 attached thereto. Advantageously, the clamp device 100 may be placed on the bar 102 in either direction in certain examples and can be considered a bi-directional clamp device. Other clamp devices, however, can only be placed on the bar 102 in a particular direction, such as the example clamp device illustrated in FIGS. 13-16, and can be considered unidirectional clamp devices.

Figure 3:
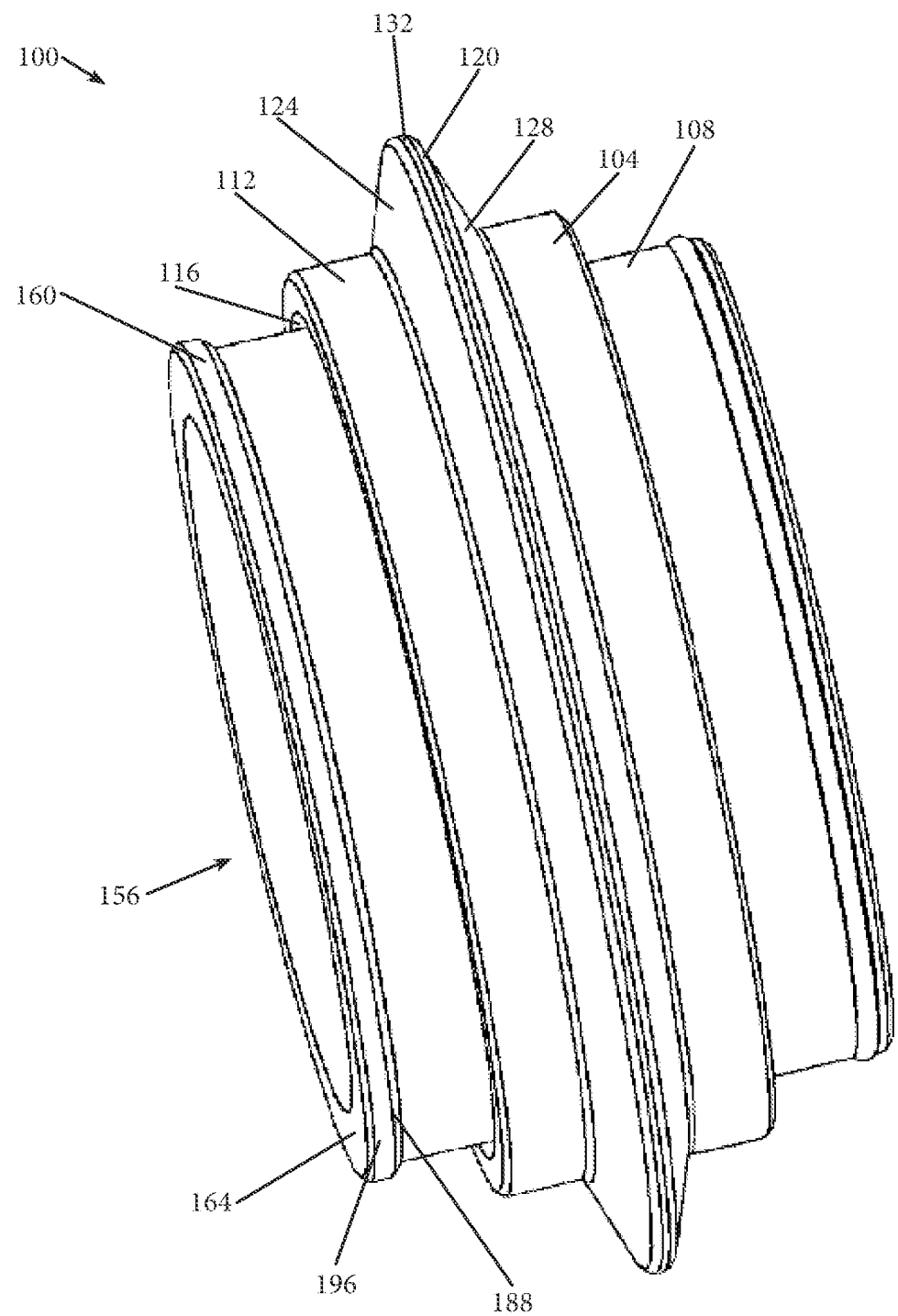
FIG. 3 illustrates a perspective view of an embodiment of a clamp device, constructed in accordance with the present disclosure.

Turning to FIG. 3, the example clamp device 100 includes an outer sleeve 104 and an inner sleeve 108 received by the outer sleeve 104. The outer sleeve 104 includes a generally annular body having an outer circumferential surface 112 and an inner circumferential surface 116. Disposed on the outer circumferential surface 112 of the outer sleeve 104 is a grip 120 for assisting in axial movement of the outer sleeve 104 relative to the inner sleeve 108. The grip 120, for example, extends radially outward from the outer circumferential surface 112 of the outer sleeve 104, and can have a tapered profile or cross-section as illustrated. The grip 120 in the presently disclosed version includes a first face 124 and a second face 128 that converge toward a rounded apex 132. In particular, the first and second faces 124, 128 of the grip 120 extend from the outer circumferential surface 112 of the outer sleeve 104 at an angle relative to the outer circumferential surface 112 and for a distance such that the first and second faces 124, 128 ergonomically support a hand or other body part of an individual using the clamp device 100. Additionally, examples of the grip 120, such as the example illustrated in FIGS. 1 and 2, can include first and second faces 124, 128 that are smooth and do not have any dents or depressions while other versions can be textured or include other features for assisting with gripping.

Figure 4:
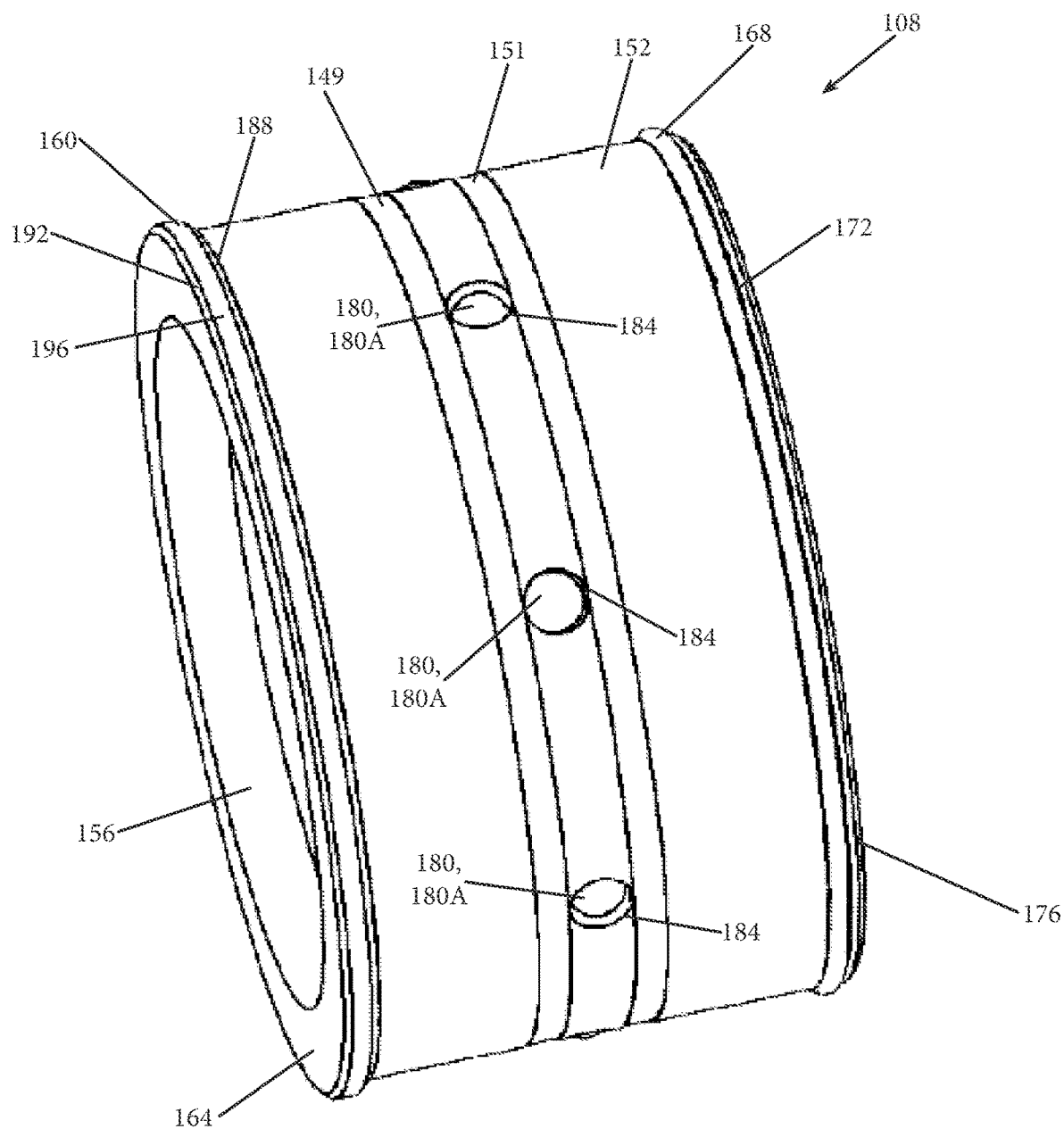
FIG. 4 illustrates a perspective view of an embodiment of an inner sleeve of the clamp device of FIG. 3, constructed in accordance with the present disclosure.

Turning now to FIG. 4, which illustrates the inner sleeve 108 including a generally annular body having an outer circumferential surface 152 and an inner circumferential surface 156 that is opposite of the outer circumferential surface 152. In the example illustrated in FIG. 4, the outer circumferential surface 152 of the inner sleeve 108 includes a stopper 160 disposed at a first end 164 of the inner sleeve 108, a ring 168 disposed in a channel 172 at a second end 176 of the inner sleeve 108 that is opposite the first end 164, and at least one rigid member 180, each of which is disposed in an opening 184. The stopper 160, the ring 168, and the at least one rigid member 180 each interact with the outer sleeve 104 to accomplish various functions. Such as, for example, retaining the outer sleeve 104 within the first and second ends 164, 176 of the inner sleeve 108 during axial translation of the outer sleeve 104, providing for easy assembly of the clamp device 100, and securing the clamp device 100 to the bar 102 on which the clamp device 100 is placed.

The stopper 160 disposed at the first end 164 of the inner sleeve 108 retains the outer sleeve 104 within the bounds of the inner sleeve 108 when the outer sleeve 104 is axially translated relative to the inner sleeve 108. In particular, the stopper 160 extends radially from the outer circumferential surface 152 of the inner sleeve 108. The example stopper 160 illustrated in FIG. 4 includes an inner face 188 and an outer face 192 that extends upwardly at an angle relative to the outer circumferential surface 152 of the inner sleeve 108 and terminates at a truncated apex 196. The inner and outer faces 188, 192 of the stopper 160 extend from the outer circumferential surface 152 of the inner sleeve 108 for a distance that is long enough to prevent the outer sleeve 104 from sliding off of the inner sleeve 108 when a force required to move the outer sleeve 104 is exerted against the outer sleeve 104. Accordingly, the distance spanned by the inner and outer surfaces 188, 192 may vary depending on the size and shape of the outer sleeve 104.

The ring 168 is disposed in the channel 172 located at the second end 176 of the inner sleeve 108. In the example illustrated in FIG. 4, the channel 172 is an annular channel, groove, or recess that extends around the circumference of the inner sleeve 108 and has a depth such that a portion of the ring 168 extends past the outer circumferential surface 152 of the inner sleeve 108. Additionally, the channel 172 has a cross-sectional shape that compliments the shape of the ring 168. For example, the ring 168 illustrated in FIG. 4 is an O-ring and has a circular cross-section. Accordingly, the channel 172 has an arcuate or semi-circular cross-section to compliment the circular cross-section of the ring 168. The complimentary shape of the channel 172 ensures that the ring 168 sits securely within the channel 172 and does not come out of the channel 172 in response to being exposed to an external force (e.g., the outer sleeve 104 pressing against the ring 168 during operation).

The complimentary shape of the channel 172 and the ring 168 also facilitates assembly of the clamp device 100. For example, the ring 168 can be made of a rigid material, such as metal, which will not compress or move out of the channel 172 when a force is applied by the outer sleeve 104 to the ring 168. So configured, the outer sleeve 104 may be slid onto the inner sleeve 108 prior to the ring 168 being placed in channel 172. In such an example, the rigid material composing the ring 168 will not compress if the outer sleeve 104 were to be slide onto the inner sleeve 108 after the ring 168 is placed in the channel 172. Accordingly, the ring 168 should be removed prior to disassembling the clamp device.

In other examples, however, the ring 168 can be made of a resilient material that can compress in response to external forces. Accordingly, in such examples, the outer sleeve 104 can be slid onto the inner sleeve 108 at the second end 176 or, alternatively, allowing the outer sleeve 104 to slidably receive the inner sleeve 108. In any event, once the outer sleeve 104 slidably receives the inner sleeve 108, the ring 168, as a result of being made of a resilient material, can expand back to the ring's original shape once the external forces are removed (i.e., once the outer sleeve 104 slides past the ring 168). In other examples, such as those involving a clamp device made of non-elastic materials (e.g., hard plastics and polymers), the resilient property of the ring 168 may not lend itself to an easy assembly of the clamp device 100. In such examples, a one-way barb, such as the example illustrated in FIGS. 19 and 20, can be used in place of or in addition to the ring 168, as will be discussed in greater detail later with reference to the example clamp device illustrated in FIGS. 19 and 20.

It should be noted that the stopper 160 and ring 168 illustrated in FIG. 4 are merely one example of a stopper and ring according to the teachings of the present disclosure, and other designs and features may be used instead of those illustrated in FIG. 4. For example, the cross-sectional shape of the stopper 160 can be square, rectangular, circular, triangular, or trapezoidal depending on the shape and side of the outer sleeve 104. Additionally, the stopper 160 may be made of the same material as the inner sleeve 108, in some examples, but could be made of a different material than the inner sleeve 108 in other examples. Similarly, the shape, size, and composition of the ring 168 may depend on the shape, size, and composition of the outer sleeve 104. For example, the ring 168 can be sized complimentary to the size of the outer sleeve 104 (i.e., a smaller ring for a smaller outer sleeve, a larger ring for a larger outer sleeve, etc.). The ring 168 can include a cross-sectional shape suitable to prevent the outer sleeve 104 from sliding off of the inner sleeve 108 such as square, rectangular, trapezoidal, pyramidal, circular, etc., cross-sectional shape. The ring 168, in some examples, can also be made of a material possessing the proper elasticity to compress, allowing quick and easy assembly of the clamp device, and expand once the clamp device is assembled and external forces on the ring are removed. In other examples, the ring 168 can be made of a rigid material that does not compress in response to external forces (i.e., the outer sleeve 104 pressing against the ring 168) and prohibits the outer sleeve 104 from sliding off of the inner sleeve 108 during use.

Turning now to the rigid members 180, which serve to transfer forces from the outer sleeve 104 to and through the inner sleeve 108. In particular, as will be discussed in greater detail below, a radially inwardly acting force exerted on each rigid member 180 by the outer sleeve 104 creates a compressive force securing the clamp device 100 to the bar 102. Accordingly, the shape, size, and placement of the rigid members 180 along with the internal geometry of the outer sleeve 104 effects the transmission of the compressive force from the outer sleeve 104 to secure the clamp device 100 to the bar 102.

For example, FIG. 4 illustrates an example shape, size, and placement of rigid members 180 where the rigid members 180 are spherical balls 180A disposed in openings 184 circumferentially located around the inner sleeve 108. In particular, the spherical balls 180A are sized to compliment the diameter and depth of the openings 184 in which they are to be received. For example, the spherical balls 180A are sized such that a portion of each spherical ball 180A protrudes outside of the opening 184. So configured, each spherical ball 180A receives some of the compressive force exerted by the outer sleeve 104 during operation, as will be described. Further, each of the spherical balls 180A is made of a material sufficiently strong to either compress slightly or not compress or otherwise deform when the outer sleeve 104 exerts the compressive force on the spherical balls 180A while securing the clamp device 100 to the bar 102. The openings 184 (which can also be referred to as apertures, holes, passages, or otherwise) extend through the outer circumferential surface 152 of the inner sleeve 108 for a distance towards the inner circumferential surface 156 of the inner sleeve 108. In the example illustrated in FIG. 4, the openings 184 are spaced equidistant from one another to ensure even distribution of forces from the outer sleeve 104 to and through the inner sleeve 108. However, the spherical balls 180A can be placed in a more or less concentrated manner around the circumference of the inner sleeve 108.

Additionally, the outer circumferential surface 152 of the inner sleeve 108 may include a visual indication of the state of the clamping device. For example, as illustrated in FIG. 4, the outer circumferential surface 152 can include a first visual indicator 149 and a second visual indicator 151 extending around the circumference of the inner sleeve 108. In particular, the first and second visual indicators 149, 151 may be colored to indicate to a user whether the clamp device 100 is secured to the bar 102 or released from the bar 102. For example, the first and second visual indicators 149, 151 can be colored green to alert the user that the clamp device 100 is secured to the bar 102. In other examples, the first and/or second visual indicators 149, 151 can be positioned outside of the outer sleeve 104 when the outer sleeve 104 is in the released position. In such an example, the first and/or second visual indicators 149, 151 can be colored red to indicate to a user that the clamp device is in the released position and not secured to the bar 102. In yet other examples, the first visual indicator 149 can only been seen when the clamp device 100 is in the secured position and the second visual indicator 151 can only be seen when the clamp device 100 is in the released position. So configured, the first visual indicator 149 can be colored green while the second visual indicator 151 can be colored red. Additionally, the first and second visual indicators 149, 151 may extend along only a portion of the circumference of the inner sleeve 108. While the first and second visual indicators 149, 151 have been described as being green or red, the visual indicators 149, 151 can be any color that draws the attention of the user.

Figure 5:
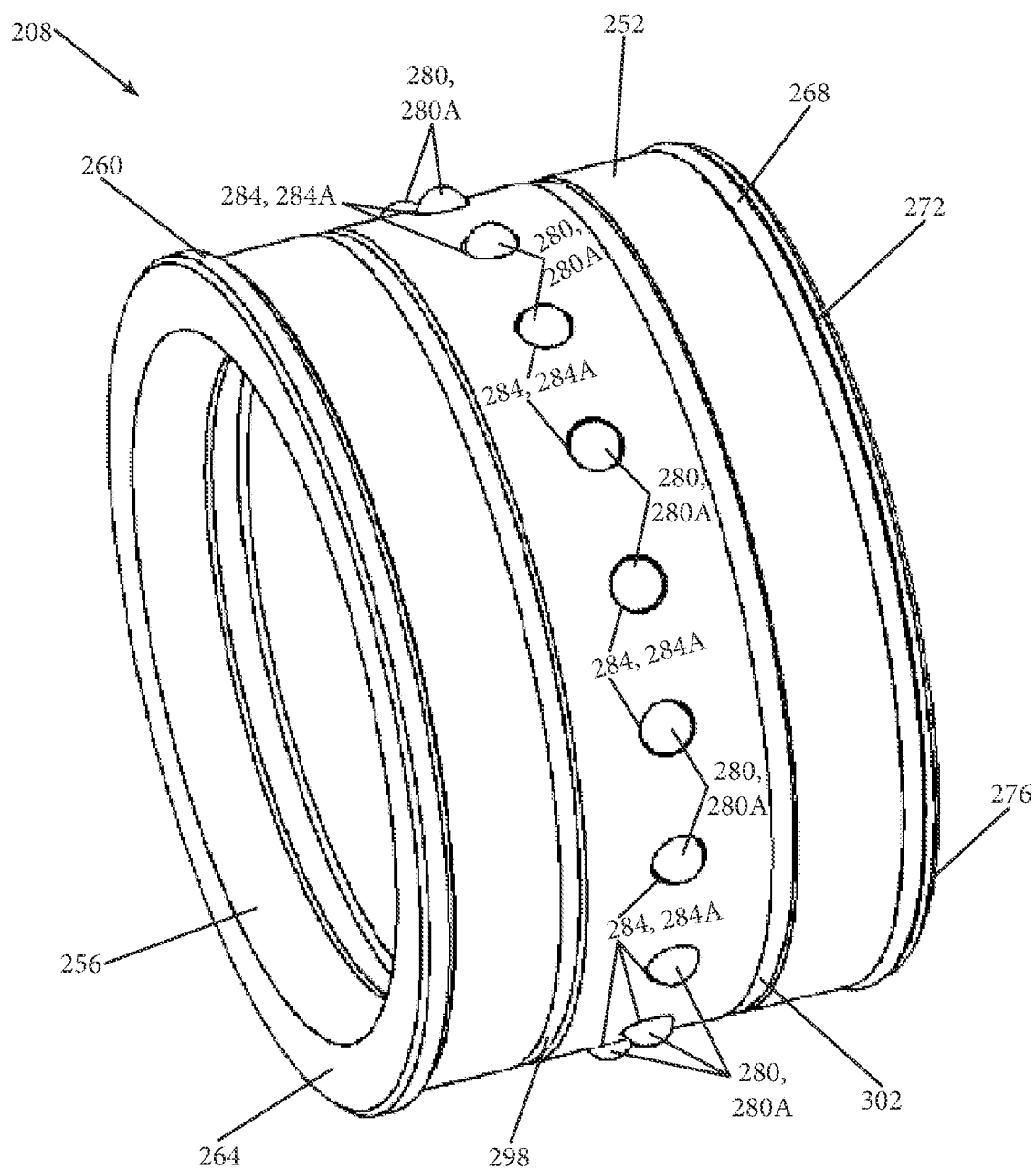
FIG. 5 illustrates a perspective view of an embodiment of an inner sleeve for the clamp device of FIG. 3, constructed in accordance with the present disclosure.
Figure 6:
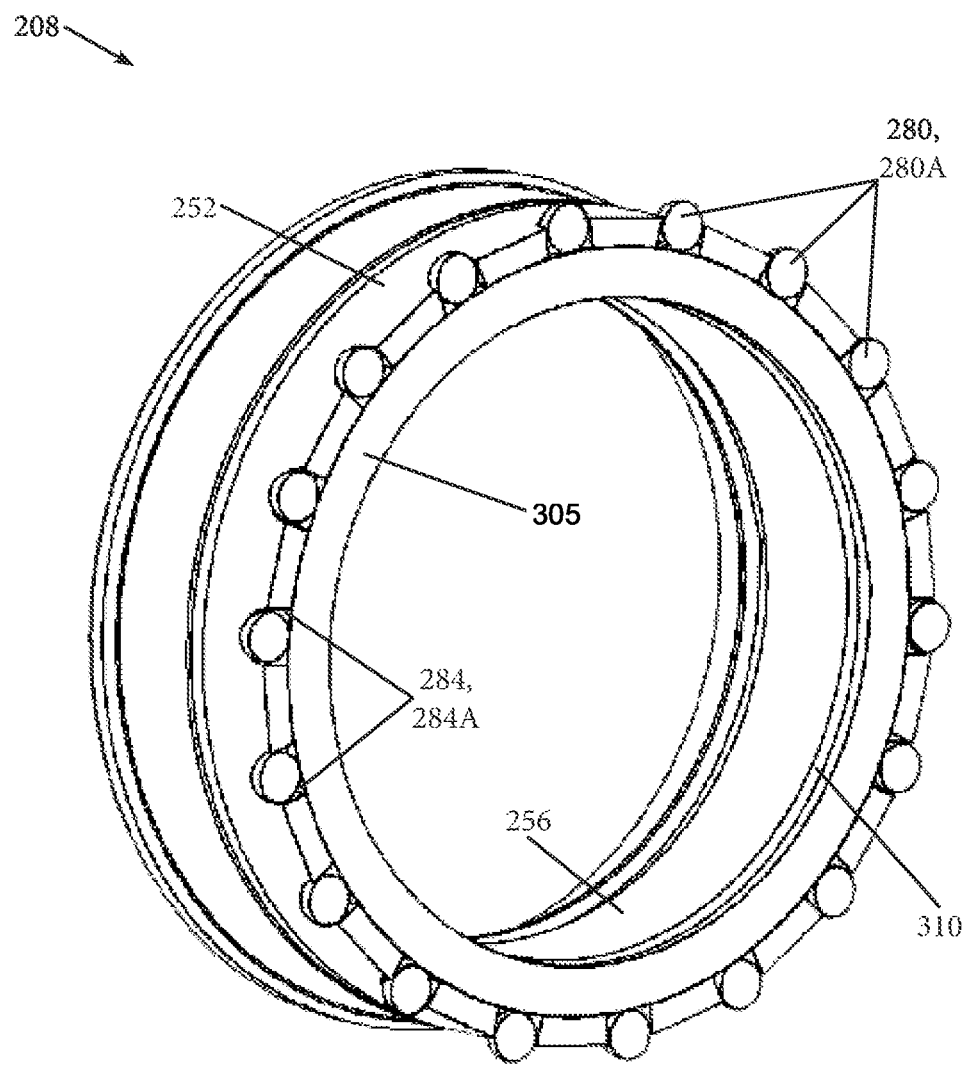
FIG. 6 illustrates a cross-sectional view of the embodiment of the inner sleeve of FIG. 5, constructed in accordance with the present disclosure.

Turning to FIGS. 5 and 6, which illustrate an alternative example inner sleeve 208 that is constructed in accordance with the teachings of the present disclosure. The inner sleeve 208 of FIGS. 5 and 6 is similar to the inner sleeve 108 of FIG. 4, except for the variations in the rigid members 280 and openings 284. Thus, for ease of reference, and to the extent possible, the same or similar components of the inner sleeve 208 will retain the same reference numbers as outlined above with respect to the inner sleeve 108, although the reference numbers will be increased by 100.

Similar to the inner sleeve 108 of FIG. 4, the example inner sleeve 208 of FIGS. 5 and 6 includes a generally annular body having an outer circumferential surface 252 and an inner circumferential surface 256 that is opposite of the outer circumferential surface 252. The outer circumferential surface 252 of the inner sleeve 208 includes a stopper 260 disposed at a first end 264 of the inner sleeve 208, a ring 268 disposed in a channel 272 at a second end 276 of the inner sleeve 208 that is opposite the first end 264, and at least one rigid member 280 each of which is disposed in an opening 284, or aperture 284A. However, unlike the inner sleeve 108 of FIG. 4, the inner sleeve 208 of FIGS. 5 and 6 includes a first groove 298, a second groove 302, and the rigid members 280 are disposed in openings 284 positioned in a different configuration than the configuration illustrated in FIG. 4.

In the example inner sleeve 208 of FIGS. 5 and 6, the first and second grooves 298, 302 are positioned on either side of the rigid members 280 which receive a detent feature (not illustrated). Additionally, the first and second grooves 298, 302 may be colored to act as visual indicators as discussed above. In particular, the first groove 298 may be disposed between the first end 264 of the inner sleeve 208 and the rigid members 280, and the second groove 302 may be disposed between the second end 276 and the rigid members 280. In the example illustrated in FIGS. 5 and 6, each of the first and second grooves 298, 302 can be an annular groove, channel, or recess that extends around the circumference of the inner sleeve 208 and has a depth such that a portion of a detent feature extends past the outer circumferential surface 252 of the inner sleeve 208. Additionally, each of the first and second grooves 298, 302 has a cross-sectional shape that compliments the shape of the detent feature. For example, if the detent feature received by the first and second grooves 298, 302 is an O-ring, or other resilient ring, each of the first and second grooves 298, 302 can have a semi-circular or arcuate cross-sectional shape. As will be explained in greater detail later, the first and second grooves 298, 302 cooperate with the outer sleeve to effectuate a position of the outer sleeve relative to the inner sleeve 208. In particular, the detents disposed within each of the first and second grooves 298, 302 exerts a force against the outer sleeve when the outer sleeve is disposed toward either side of the inner sleeve 208. So configured, the force exerted by the detent feature against the outer sleeve retains the outer sleeve in the central position seen later in FIG. 9, which allows the clamp to slide without engaging the bar.

As best illustrated in FIG. 6, the rigid members 280 of inner sleeve 208 are disposed in an example configuration that is different from the example configuration of rigid members 180 in the inner sleeve 108. In particular, the configuration of rigid members 280 in FIG. 6 differs from the configuration of rigid members 180 in FIG. 4, in that the rigid members 280 in FIG. 6 are positioned closer to one another and there are additional rigid members 280, which may more efficiently transfer the compressive force from the outer sleeve to and through the inner sleeve 208. In particular, having more rigid members 280 disposed in the inner sleeve 208 helps to create a more uniform compressive force on the bar 102 disposed in the opening created by the inner sleeve 208. A more uniform compressive force is beneficial because the clamp device can be more tightly secured to the bar 102 disposed in the opening created by the inner sleeve 208. Additionally, FIG. 6 illustrates a resilient ring 305 disposed in a channel 310 that extends through the inner sleeve 208 between the outer circumferential surface 252 and the inner circumferential surface 256. The resilient ring 305, which was not illustrated in the previous Figures, receives the compressive force exerted by the outer sleeve vis-à-vis the at least one rigid member 280 such that the resilient ring 305 deforms under the compressive force thereby securing the clamp device to the bar 102. As discussed above, having more rigid members 280 disposed in the inner sleeve 208 can more uniformly deform the resilient ring 305 thereby creating a tighter clamp.

Figure 7:
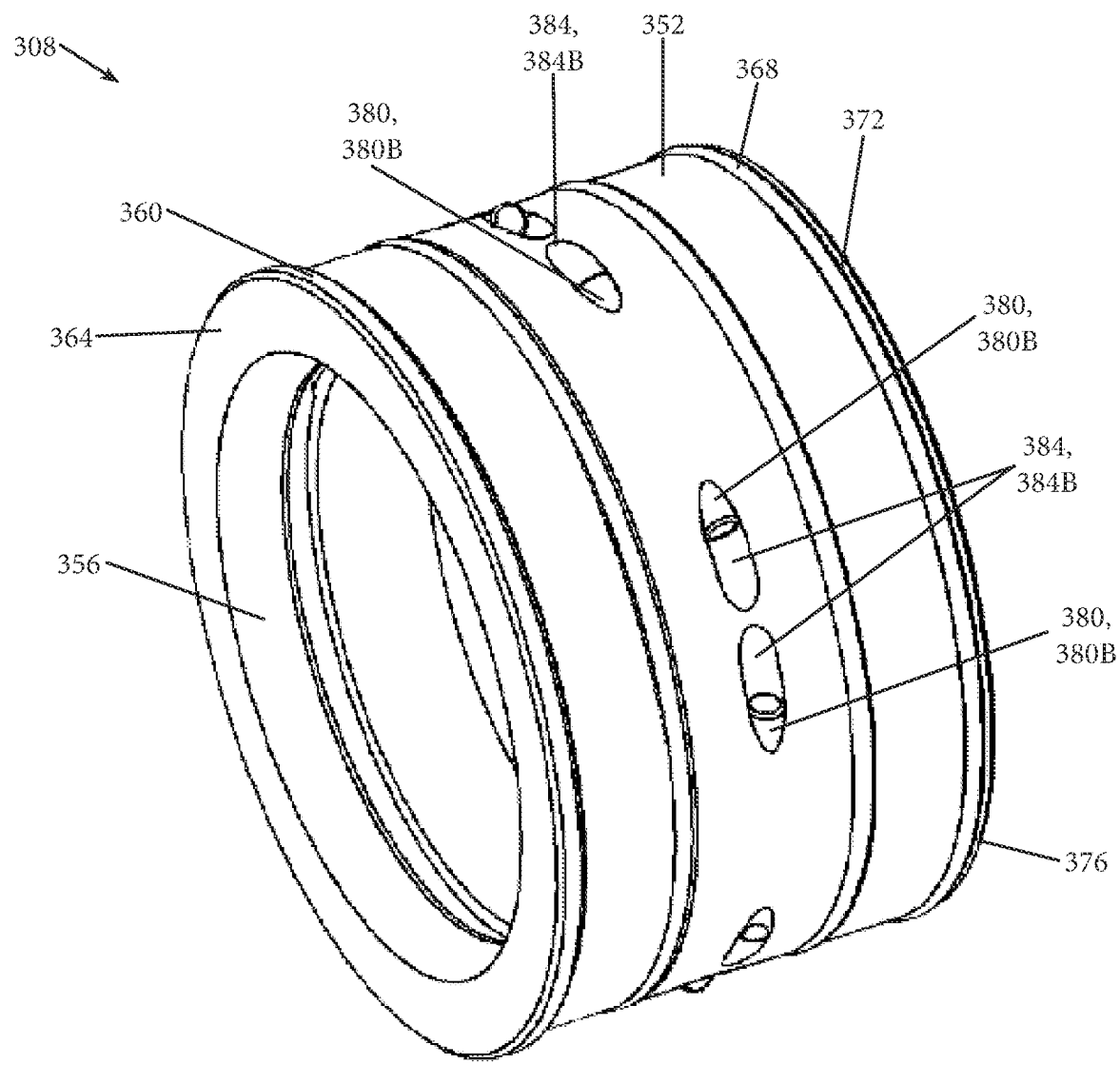
FIG. 7 illustrates a perspective view of another embodiment of an inner sleeve for the clamp device of FIG. 3, constructed in accordance with the present disclosure.
Figure 8:
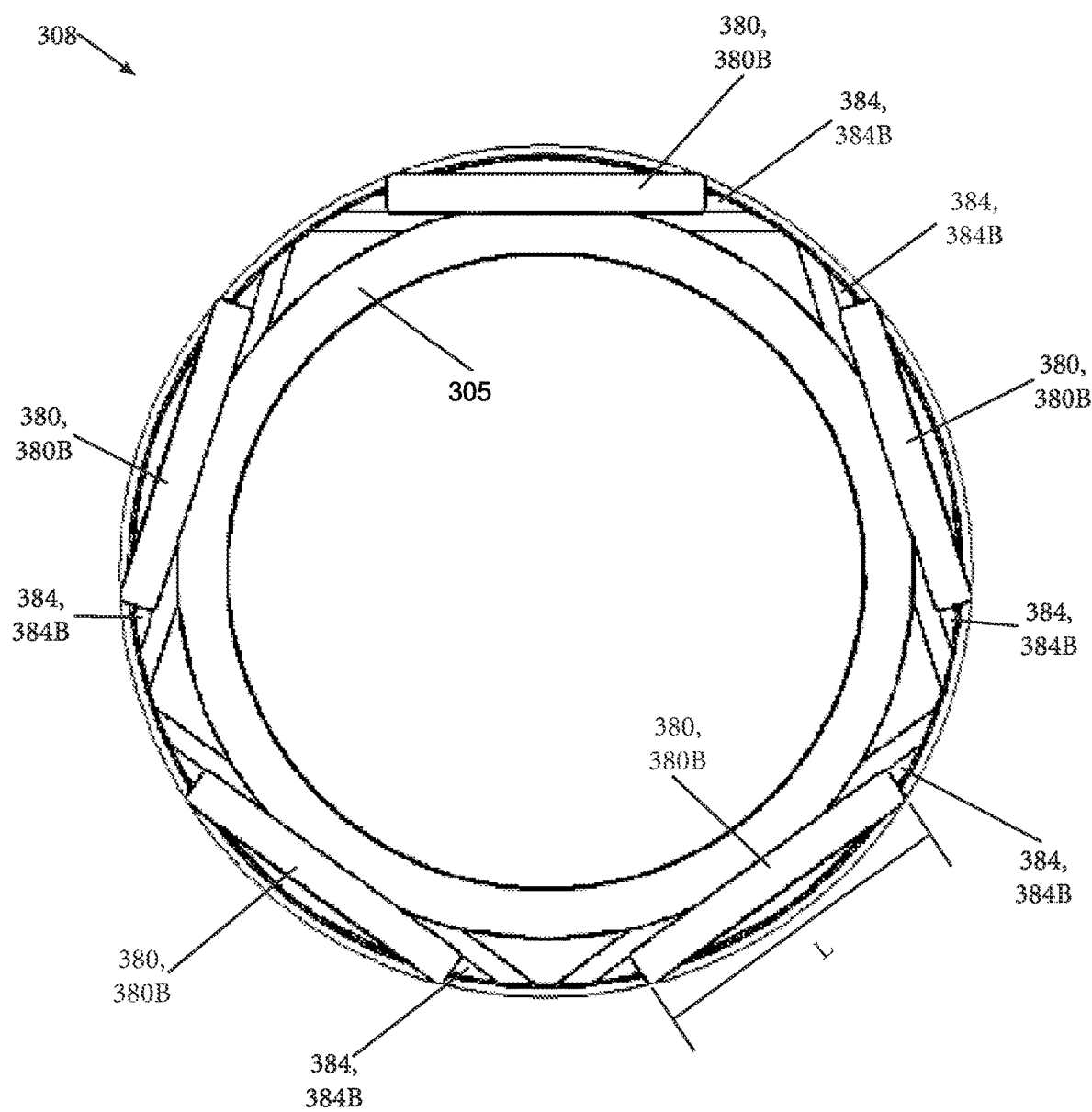
FIG. 8 illustrates a cross-sectional view of the embodiment of the inner sleeve of FIG. 7, constructed in accordance with the present disclosure.

Turning now to FIGS. 7 and 8, which illustrate another alternative of an example inner sleeve 308 that is constructed in accordance with the teachings of the present disclosure. The inner sleeve 308 of FIGS. 7 and 8 is similar to the inner sleeve 208 of FIGS. 5 and 6, except for the variations in the rigid members 380 and openings 384. Thus, for ease of reference, and to the extent possible, the same or similar components of inner sleeve 308 will retain the same reference numbers as outlined above with respect to inner sleeve 208, although the reference numbers will be increased by 100.

Similar to the inner sleeve 208 of FIGS. 5 and 6, the example inner sleeve 308 of FIGS. 7 and 8 includes a generally annular body having an outer circumferential surface 352 and an inner circumferential surface 356 that is opposite of the outer circumferential surface 352. The outer circumferential surface 352 of the inner sleeve 308 includes a stopper 360 disposed at a first end 364 of the inner sleeve 308, a ring 368 disposed in a channel 372 at a second end 376 of the inner sleeve 308 that is opposite the first end 364, and at least one rigid member 380 each of which is disposed in an opening 384. However, unlike the inner sleeve 208 of FIGS. 5 and 6, the inner sleeve 308 of FIGS. 7 and 8 includes another example of rigid members 380 and openings 384 that are different from the rigid members 280 and openings 284 of FIGS. 5 and 6.

As best illustrated in FIG. 8, the example rigid members 380 of the inner sleeve 308 take on a different form than rigid members 180, or spherical balls 180A, from FIG. 4 and rigid members 280, or spherical balls 280A, from FIGS. 5 and 6. In particular, each rigid member 380 is a pin 380B disposed in an opening 384, or channel 384B, such that the pins 380B and the channels 384B are disposed tangentially to the inner sleeve 308 as a whole. The channels 384B are circumferentially spaced around the inner sleeve 308 such that a received pin 380B sits tangential to the inner sleeve 308. The pins 380B are elongated cylinders having a length L such that a substantial portion of the length of the pin 380B is disposed within the channels 384B in the inner sleeve 308. Each of the channels 384B in the inner sleeve 308 extend for a distance through the outer circumferential surface 352 of the inner sleeve 308 toward the inner circumferential surface 356. In the example illustrated in FIG. 8, the channels 384B extend through the outer circumferential surface 352 for a distance less than the distance between the outer and inner circumferential surfaces 352, 356. In other examples, however, the channels 384B extend through the outer circumferential surface 352 for a distance greater than the distance between the outer and inner circumferential surfaces 352, 356. Additionally, the example channels 384B of FIG. 8 extend in a manner that causes the pins 380B to be tangential to the resilient ring 305 in an uncompressed state.

While certain examples of pins 380B and channels 384B are discussed above, it is not intended that the disclosure be limited to those examples. For example, the pins 380 can take other shapes and sizes. For example, the pins 380B can be rectangular, triangular, hexagonal, pentagonal, and trapezoidal. Further, the pins 380B need not be straight and could be curved, angled, V-shaped, S-shaped, U-shaped, or otherwise. In some examples, the pins 380B can be curved to follow the circumference of the inner sleeve 308. Accordingly, the channels 384B may be shaped and sized to compliment the shape and size of the pins 380B. For example, if a pin 380B has a triangular cross-section and is bent, the channel 384B that receives the triangular, bent pin 380B can also have a triangular cross-section and follow the same bend as the pin 380B.

Figure 9:
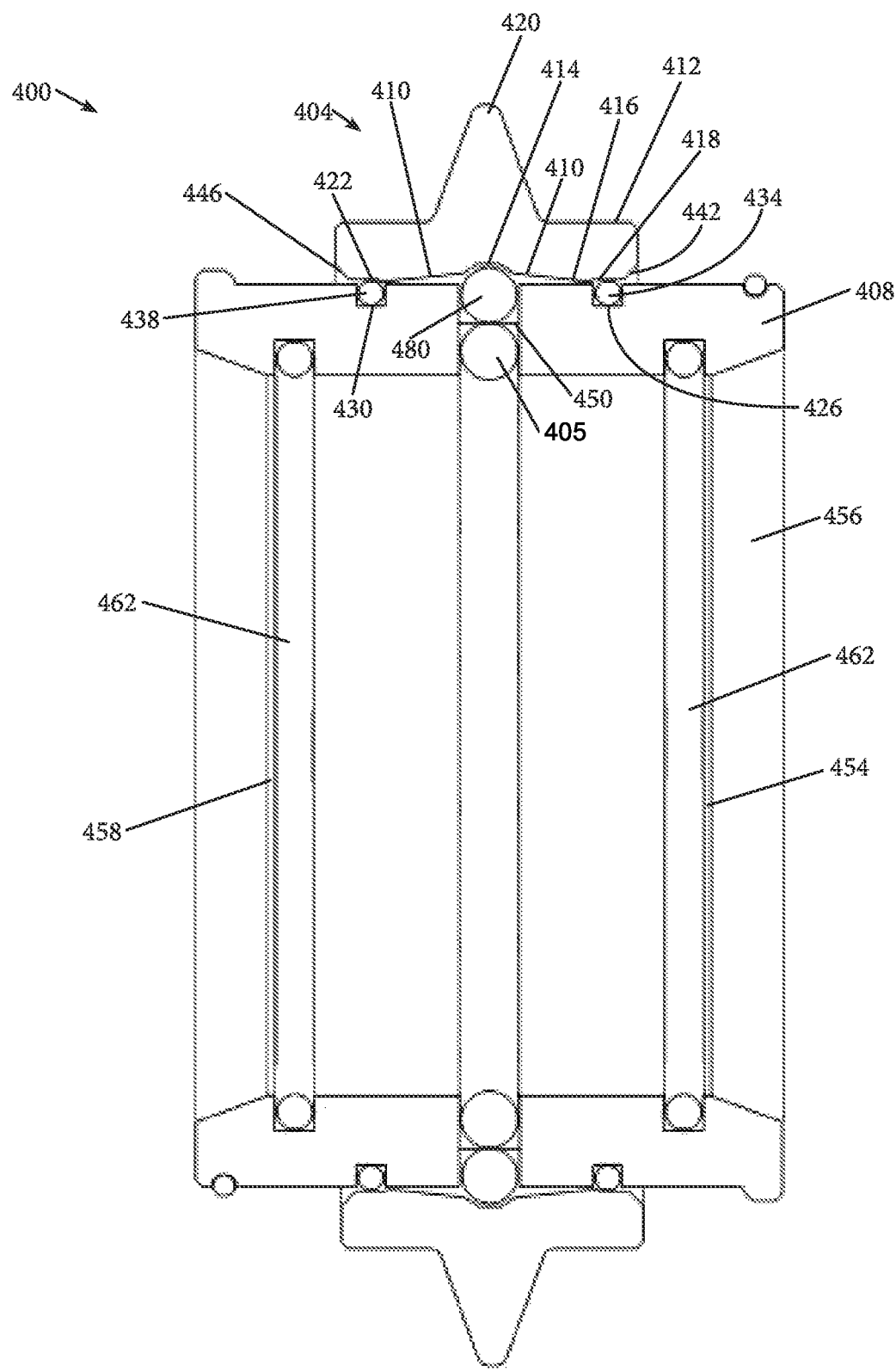
FIG. 9 illustrates a cross-sectional view of the clamp device of FIG. 3, constructed in accordance with the present disclosure.

Turning now to FIG. 9, which illustrates a cross-section of an example clamp device 400 and the interaction of the outer sleeve 404 and the inner sleeve 408, according to the teachings of the present disclosure. The clamp device 400 of FIG. 9 is similar to the clamp device 100 of FIG. 3. Thus, for ease of reference, and to the extent possible, the same or similar components of the clamp device 400 will retain the same reference numbers as outlined above with respect to clamp device 100, although the reference numbers will be increased by 300.

Similar to the clamp device 100 of FIG. 3, the example clamp device 400 of FIG. 9 includes the outer sleeve 404 and the inner sleeve 408 received by the outer sleeve 404. The outer sleeve 404 includes the outer circumferential surface 412 and the inner circumferential surface 416. The inner circumferential surface 416 of the outer sleeve 404 defines a plurality of ramped surfaces 410, a first annular groove 414, a second annular groove 418, and a third annular groove 422. In the example illustrated in FIG. 9, the first annular groove 414 is disposed at a center of the inner sleeve 408. The second and third annular grooves 418, 422 are disposed on either side of the first annular groove 414. So configured, the first annular groove 414 is disposed between the second and third grooves 418, 422.

Each ramped surface 410 extends from respective ends of the outer sleeve 404 toward the first annular groove 414 to define a concave surface. More particularly, each ramped surface 410 extends outward radially from respective second and third annular grooves 418, 422 toward the first annular groove 414 thereby defining the concave cross-section of the inner circumferential surface 416 of the outer sleeve 404. In turn, the ramped surfaces 410 may extend in a variety of ways from the respective second and third annular grooves 418, 422. For example, the ramped surfaces 410 illustrated in FIG. 9 extend toward the first annular groove 414 at a continuous angle radially outward from the inner circumferential surface 416 of the outer sleeve 404. However, the ramped surfaces 410 can extend radially outward in other ways, such that the cross-section of the inner circumferential surface 416 of the outer sleeve 404 is concave. For example, the ramped surfaces 410 can extend from the second and third annular grooves 418, 422 toward the first annular groove 414 following a spline. In other examples, the ramped surfaces 410 can extend from the second and third annular grooves 418, 422 toward the first annular groove 414 in a stepwise manner.

The second and third annular grooves 418, 422 are positioned in the inner circumferential surface 416 of the outer sleeve 404 such that they cooperate with second and third channels 426, 430 formed in the outer circumferential surface of the inner sleeve 408. In particular, the second annular groove 418 is sized to receive a portion of the detent 434 disposed in the second channel 426 and the third annular groove 422 is sized to receive a portion of the detent 438 in the third channel 430. In addition to the rigid member 480 being disposed in the first annular groove 414, the second annular groove 418, second channel 426, third annular groove 422, and third channel 430 cooperate to retain the outer sleeve 404 in a released configuration, which is illustrated in FIG. 9. For example, detent 434 and detent 438 can be made of a resilient material such that detent 434 and detent 438 compress as the outer sleeve 404 translates axially relative to the inner sleeve 408 and expand when the second and third annular grooves 418, 422 reach detent 434 and detent 438, respectively. It should be noted that detent 434 and detent 438 provide enough staying force to prevent the outer sleeve 404 from moving unexpectedly or due to incidental contact with the grip 420 of the outer sleeve 404. So configured, in the example illustrated in FIG. 9, the detents 434, 438 cooperate with the first and second annular grooves 418, 422 to provide the force necessary to retain the clamp device 400 in the released position until it is desired that the clamp device 400 be secured to a bar (i.e., until the clamp device 400 abuts a weight slidably disposed on the bar). Accordingly, in the example illustrated in FIG. 9, the recess 414 does not provide the force necessary to retain the clamp device 400 in the released position until it is desired that the clamp device 400 be secured to a bar.

Further, the detents 434, 438 may cooperate with angled surfaces 442, 446 disposed near the inner circumferential surface 416 of the outer sleeve 404. In particular, the example angled surfaces 442, 446 illustrated in FIG. 9 create a surface that exerts a force normal to either one of the detents 434, 438 when in contact. Specifically, the detents 434, 438 can exert a force normal to the angled surfaces 442, 446, respectively, to prevent the outer sleeve 404 from moving back into the released position once the outer sleeve 404 is in the secured position.

The inner sleeve 408 also includes a rigid ring 450 disposed between the rigid member 480 and the resilient ring 405, a fourth channel 454 disposed in the inner circumferential surface 456 of the inner sleeve 408, and a fifth channel 458 disposed in the inner circumferential surface 456 of the inner sleeve 408. The rigid ring 450 helps to transfer the force exerted upon the rigid members 480 disposed in the channel 484 to the resilient ring 405 that is in contact with the bar 102. Similarly, the fourth and fifth channels 454, 458 receive additional resilient rings 462 to assist in securing the clamp device to the bar 102 or prevent damage or wear to the bar 102 and/or clamp 400.

Figure 10:
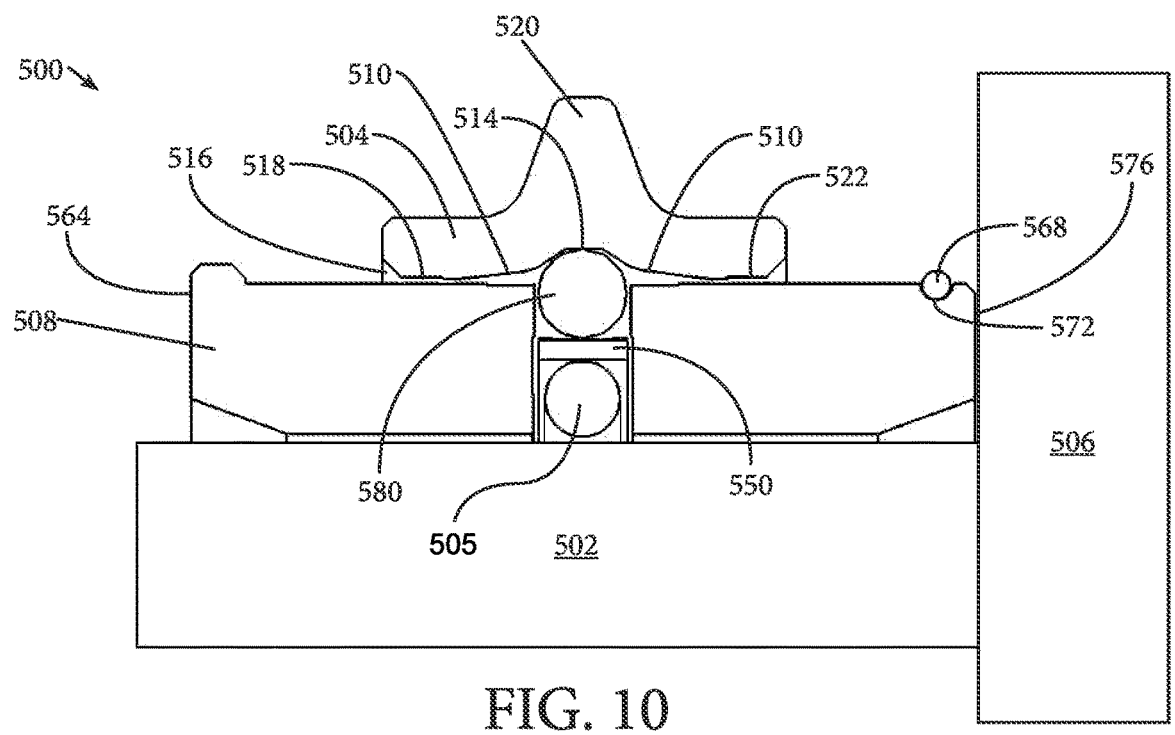
FIG. 10 illustrates a cross-sectional view of an embodiment of the clamp device, constructed in accordance with the present disclosure, in a released position.
Figure 11:
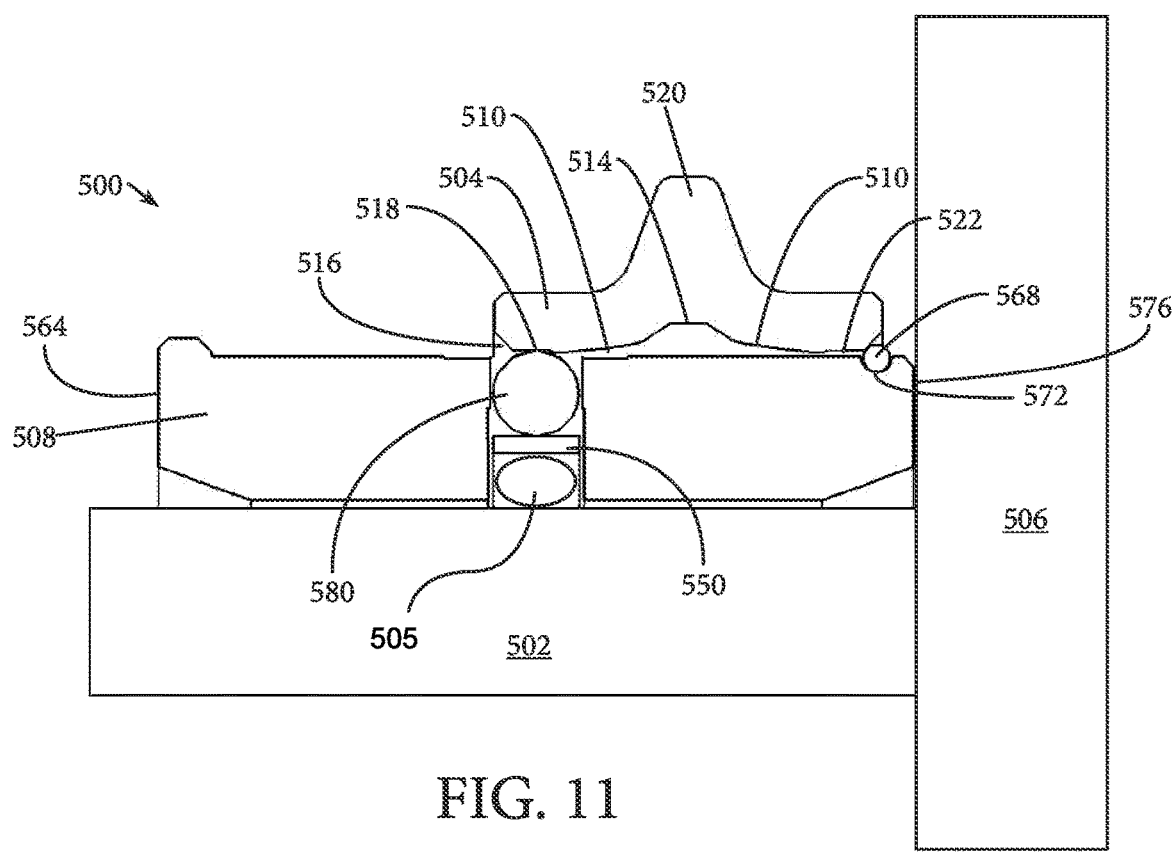
FIG. 11 illustrates a cross-sectional view of the clamp device of FIG. 10, constructed in accordance with the present disclosure, in a secured position.
Figure 12:
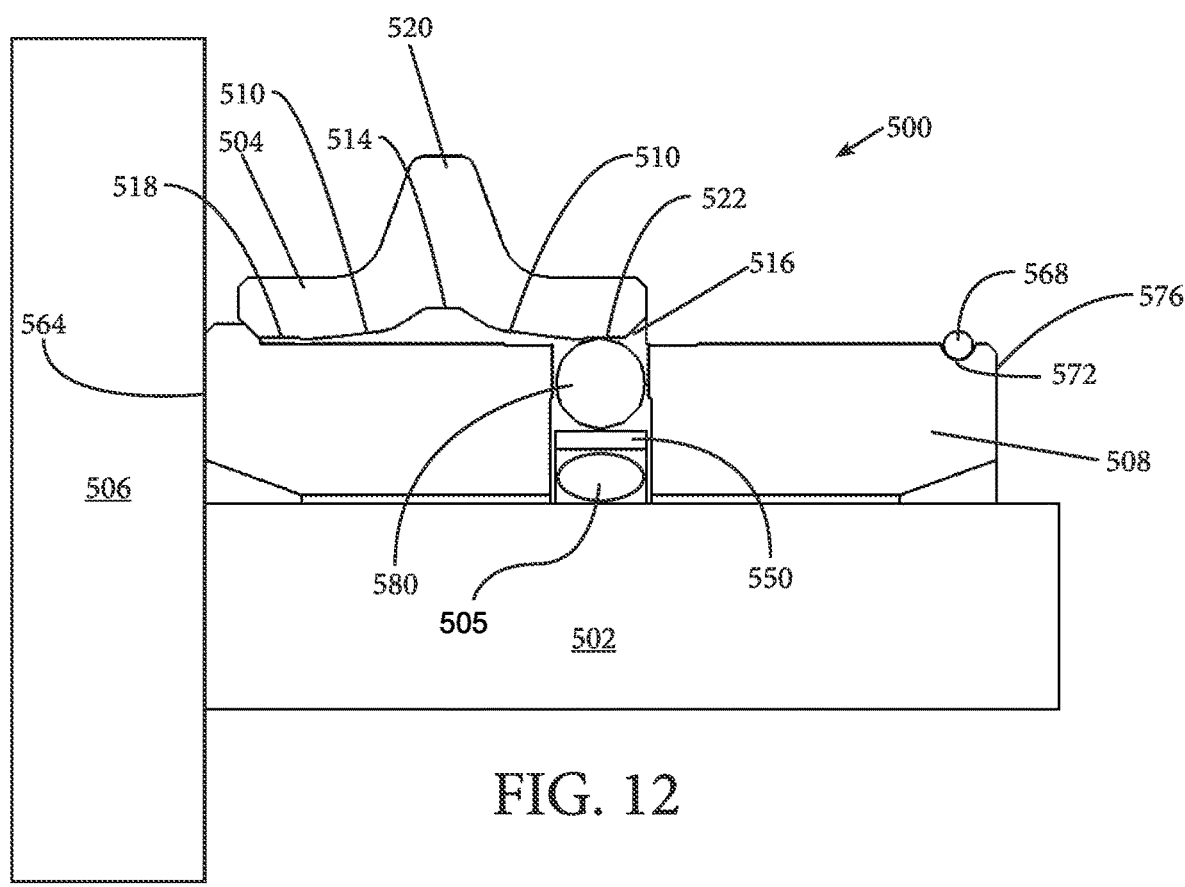
FIG. 12 illustrates a cross-sectional view of the clamp device of FIG. 10, constructed in accordance with the present disclosure, in a secured position.
Figure 13:
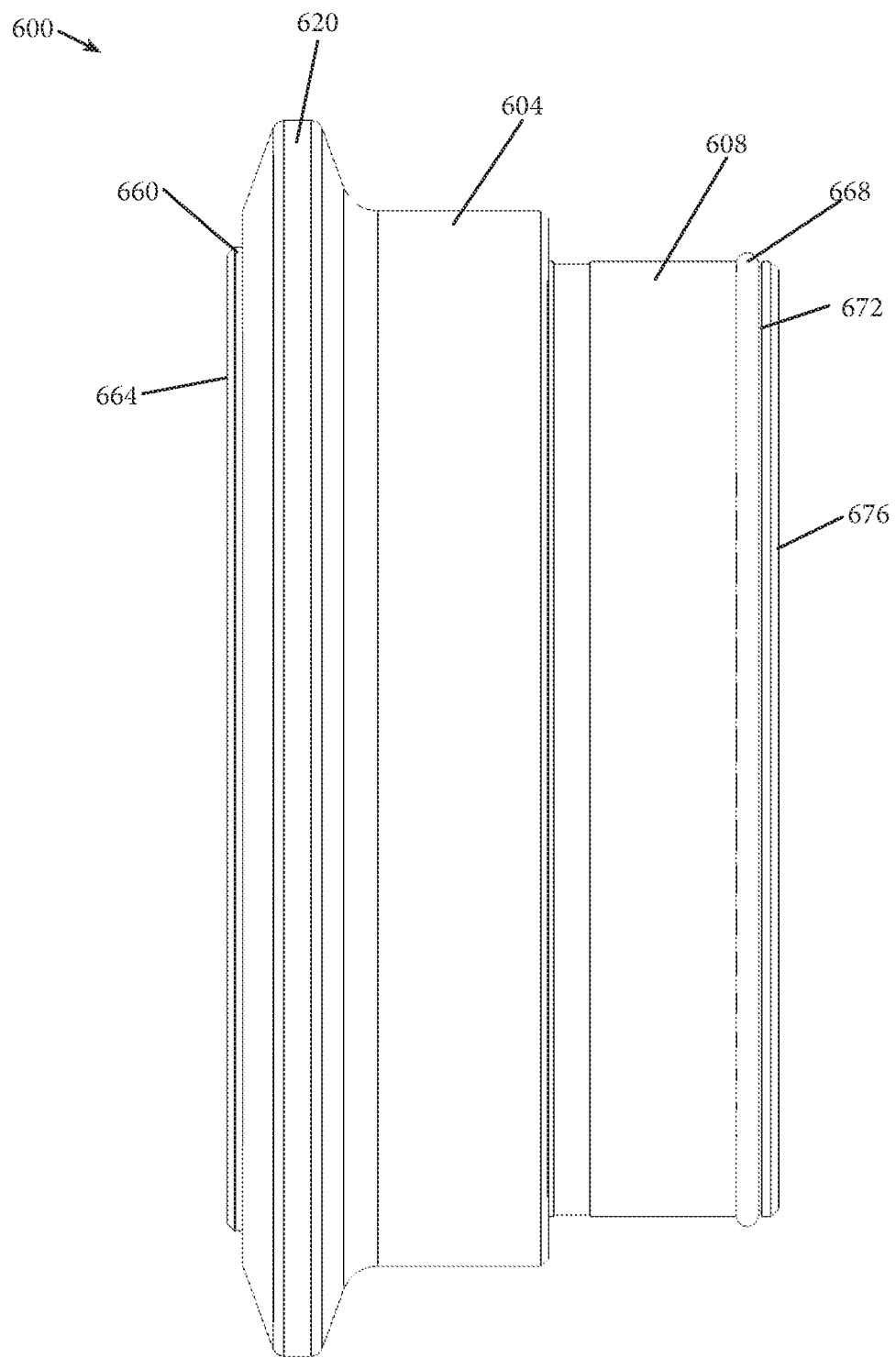
FIG. 13 illustrates a cross-sectional view of an embodiment of a clamp device, constructed in accordance with the present disclosure, in a released position.
Figure 14:
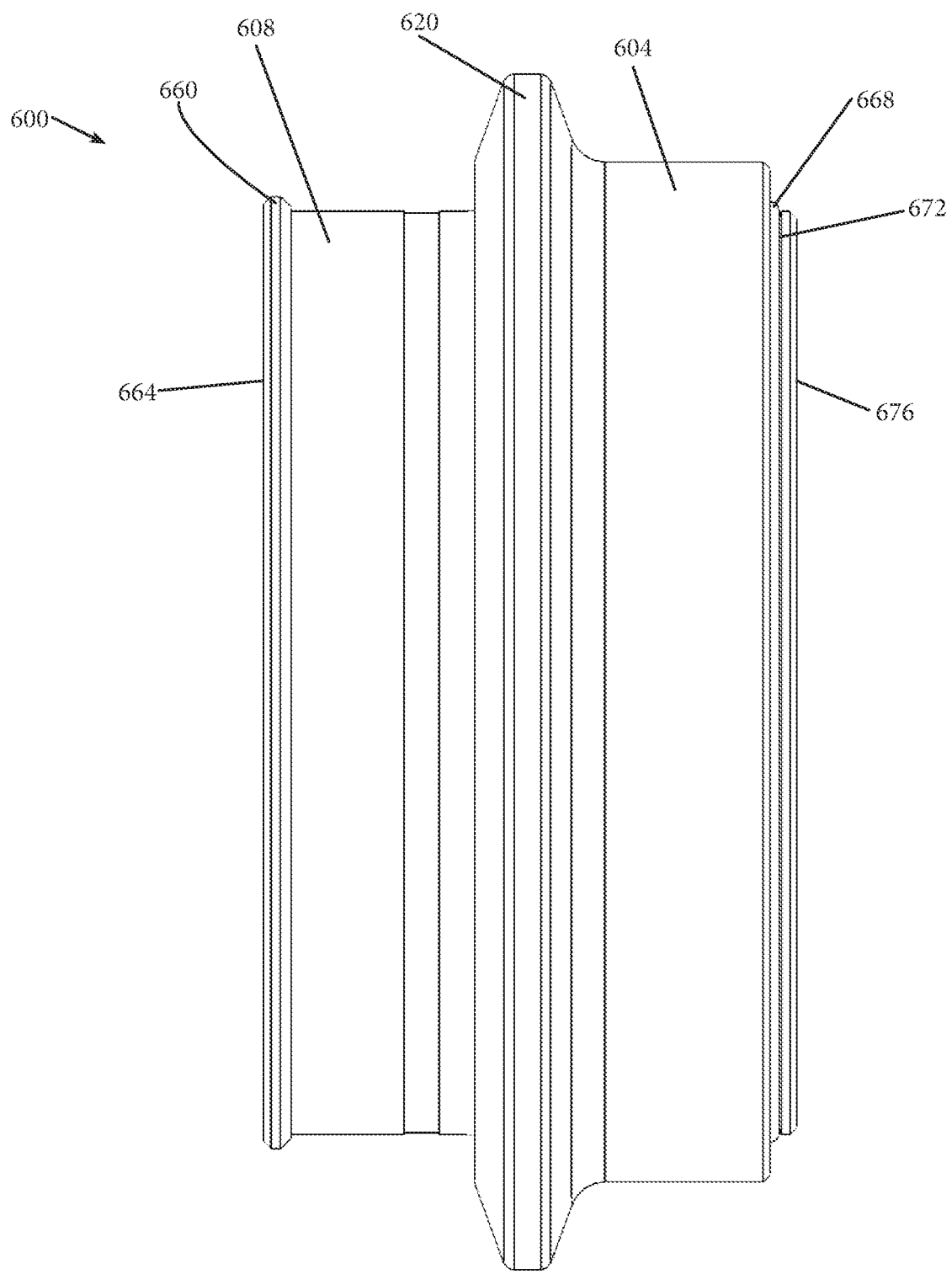
FIG. 14 illustrates a perspective view of the clamp device of FIG. 13, constructed in accordance with the present disclosure, in a secured position.
Figure 15:
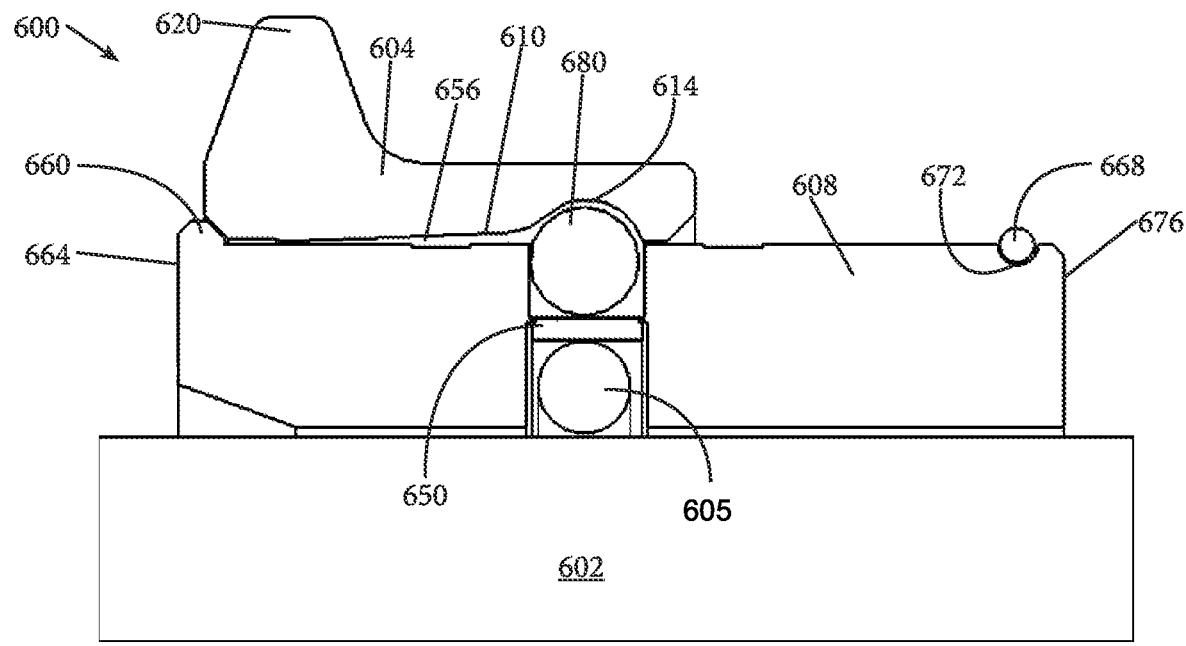
FIG. 15 illustrates a cross-sectional view of the clamp device of FIG. 13, constructed in accordance with the present disclosure.
Figure 16:
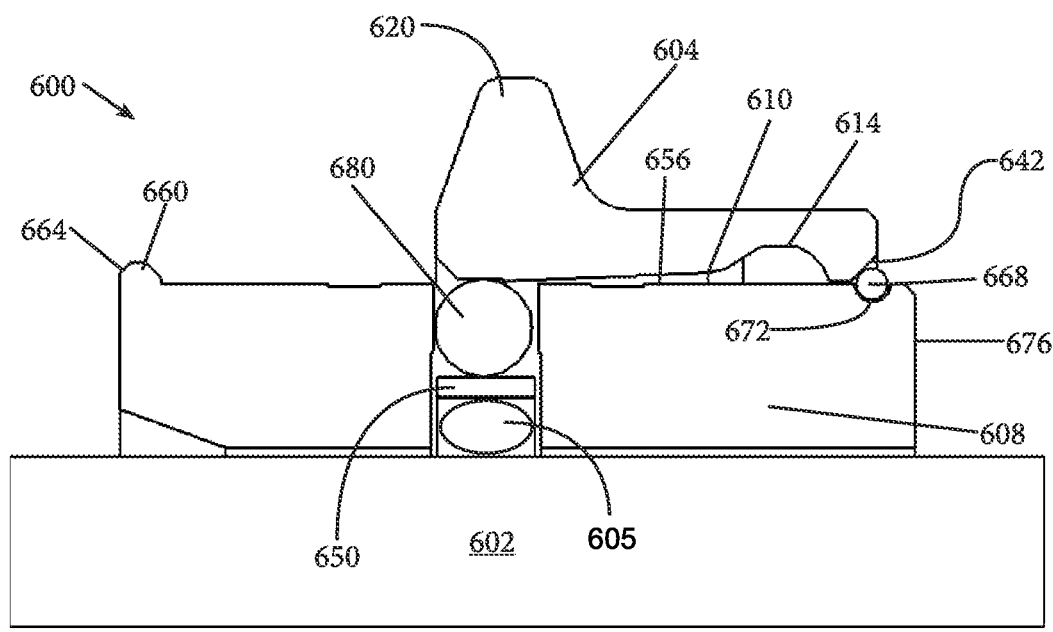
FIG. 16 illustrates a cross-sectional view of the clamp device of FIG. 14, constructed in accordance with the present disclosure.

Now, securement and release of the clamp device 500 to the bar will be described with reference to FIGS. 10-12. FIG. 10 illustrates the example clamp device 500 in a released position and FIGS. 11 and 12 illustrate the example clamp device 500 in a secured position. Movement of the outer sleeve 504 from the released position in FIG. 10 to the secured position in either of FIG. 11 or 12 occurs by exerting a force of the grip 520 that causes the outer sleeve 504 to axially translate relative to the inner sleeve 508 toward either the first or second end 564, 576 of the inner sleeve 508, most conveniently the end that abuts the weights 506. As the outer sleeve 504 axially translates, each of the rigid members 580 move out of contact with the first annular groove 514 and are placed in contact with one of the plurality of ramped surfaces 510. Importantly, unlike the example clamp device 400 illustrated in FIG. 9, the first annular recess 514 of the example clamp device 500 illustrated in FIGS. 10-12 retains the outer sleeve 504 in the released position. Accordingly, a small force must be exerted on the grip 520 to cause the rigid members 580 to move out of the first annular recess 514, which may not occur until the clamp device 500 abuts the weight 506 disposed on the bar 502.

Notably, in the example clamp device 500 illustrated in FIGS. 10-12, the outer sleeve 504 can be axially translated toward either the first end 564 of the inner sleeve 508 or the second end 576 of the inner sleeve 508, i.e., it is bi-directional. As the outer sleeve 504 axially translates, one of the ramped surfaces 510 exerts a compressive force on each of the rigid members 580, which increases as the ramped surface 510 travels axially along each of the rigid members 580 due to the angle of the ramped surface 510. In response to the compressive force, each of the rigid members 580 move uniformly radially inward toward the bar 502 disposed within the inner sleeve 508. As each of the rigid members 580 are displaced radially inward toward the bar, the rigid members 580 begin to uniformly compress both the rigid ring 550 and the resilient ring 505, thereby translating the compressive force exerted from the outer sleeve 504 to the resilient ring 505 and against the bar 502.

In turn, as each of the rigid members 580 continue to translate radially inward toward the bar 502 disposed within the inner sleeve 508, the rigid ring 550 evenly distributes the compressive force from each of the rigid members 580. So configured, the now evenly distributed force exerted on the resilient ring 505 causes the resilient ring 505 to deform from the generally circular cross-section illustrated in FIG. 10 to the generally oblique cross-section illustrated in FIGS. 11 and 12. Upon reaching either the first or second ends 564, 576 of the inner sleeve 508, the outer sleeve 504 will both abut the ring 568 disposed in the channel 572 and receive the rigid member 580 in one of either the second or third annular grooves 518, 522. In some examples, the second or third annular groove 518, 522 is sized to receive and retain the rigid member 580 so as to retain the outer sleeve 504 in the secured position. Once in the position illustrated in FIG. 11 or 12, the outer sleeve 504 will exert the greatest compressive force on the resilient ring 505 thereby securing the clamp device 500 to the bar 502.

To release the clamp device 500 from the bar 502, the outer sleeve 504 is axially translated back toward the center of the outer sleeve 504. In doing so, each of the rigid members 580 that were compressed may now be displaced radially outward relative to the bar 502 because of the concave cross-sectional shape of the inner circumferential surface 516 of the outer sleeve 504. The outward radial displacement of each of the rigid members 580 removes the compressive force being exerted on the rigid ring 550 and the resilient ring 505 allowing the resilient ring 505 to expand from the generally oblique cross-section illustrated in FIGS. 11 and 12 to the generally circular cross-section illustrated in FIG. 10. Once the outer sleeve 504 reaches the center of the inner sleeve 508, each of the rigid members 580 will be disposed in the first annular groove 514 thereby removing a majority of the compressive forces exerted by the outer sleeve 504. At this point, the clamp device 500 can slide freely along the bar 502 and be removed from the bar 502.

As briefly mentioned, in some example clamp devices the outer sleeve is not axially translatable toward either the first end or the second end of the inner sleeve to secure the clamp device 600 to the bar 602. In such examples, the outer sleeve is axially translatable toward only one of the first or second ends of the inner sleeve. FIGS. 13-16 illustrate such an example. The clamp device 600 of FIGS. 13-16 is similar to the clamp device 500 of FIGS. 10-12 in that the clamp device 600 includes the outer sleeve 604 slidably received by the inner sleeve 608 and the inner sleeve 608 includes the stopper 660 disposed at the first end 664, the ring 668 disposed in the channel 672 at the second end 676, and at least one rigid member 680 disposed in the annular groove 614. The inner sleeve 608 also includes the rigid ring 650 and the resilient ring 605, and the outer sleeve 604 includes the grip 620. However, the clamp device 600 of FIGS. 13-16 is different from the clamp device 500 of FIGS. 10-12 in that the clamp device 600 includes an outer sleeve 604 having only one ramped surface 610 disposed on an inner circumferential surface 656. As a result of the only one ramped surface 610, the outer sleeve 604 is movable toward only one end of the inner sleeve. While only having one ramped surface, the clamp device 600 of FIGS. 13-16 functions substantially similar to the clamp device 500 of FIGS. 10-12 as described in the immediately preceding paragraphs.

Figure 17:
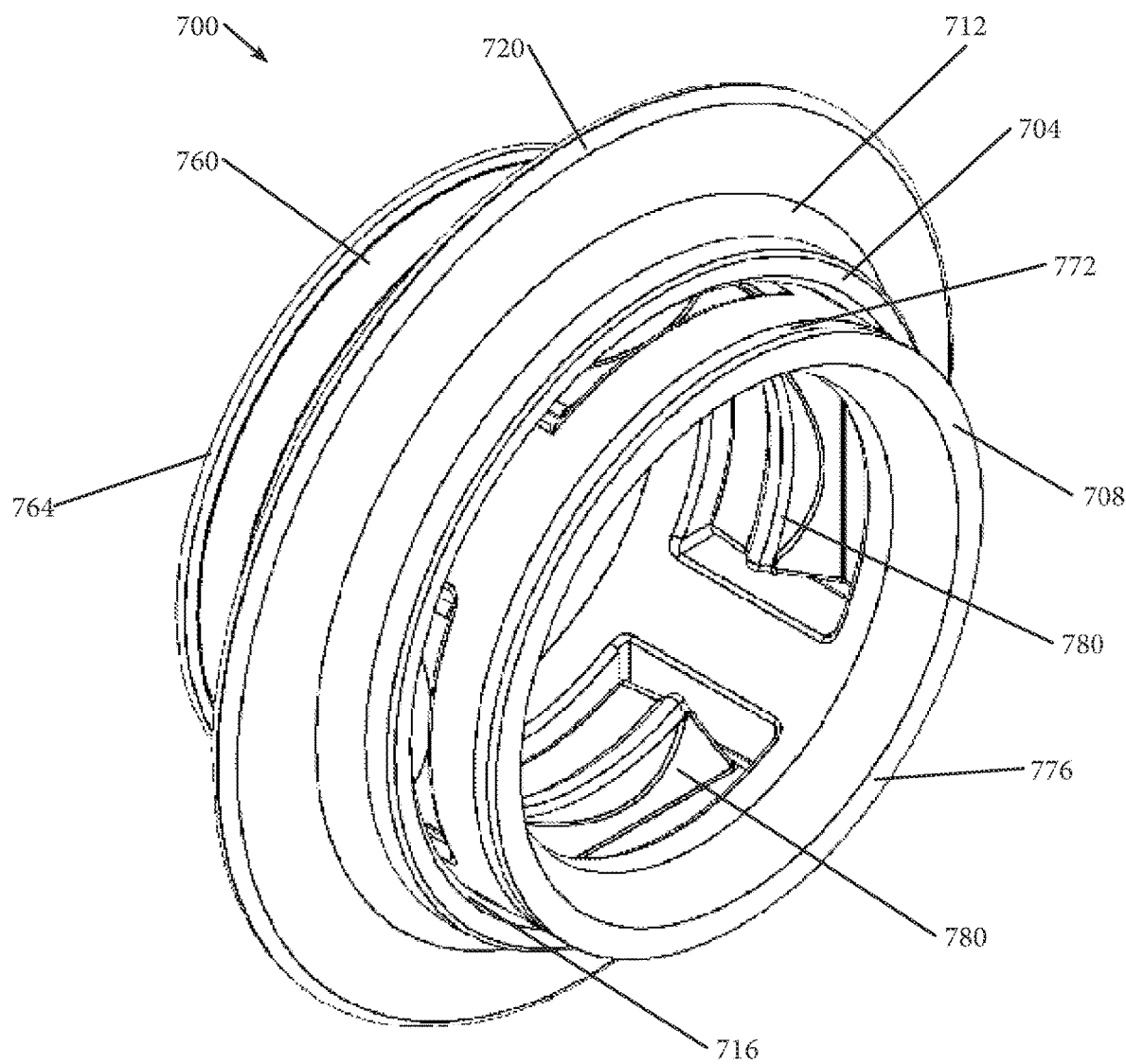
FIG. 17 illustrates a perspective view of another embodiment of a clamp device, constructed in accordance with the present disclosure.
Figure 18:
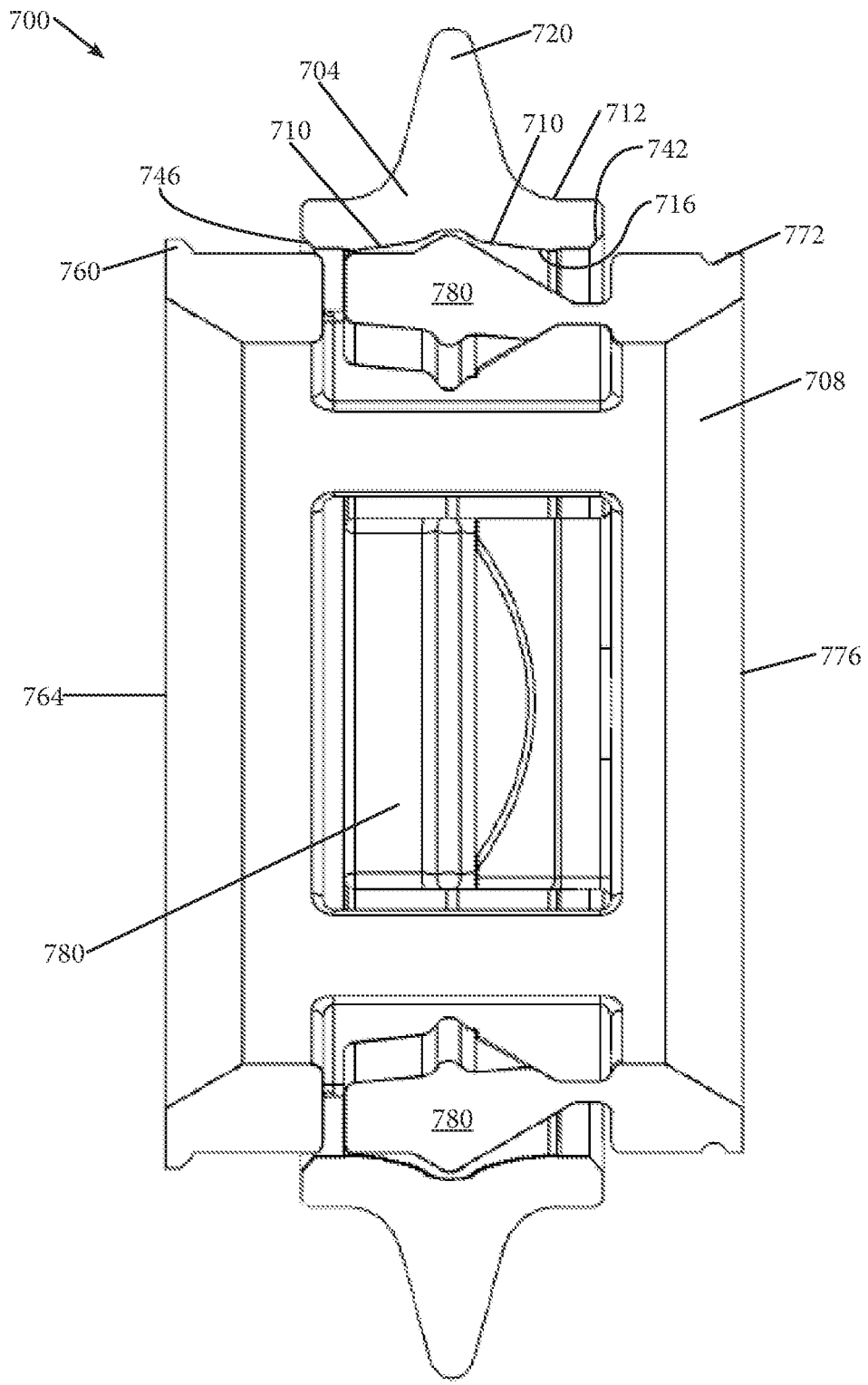
FIG. 18 illustrates a cross-sectional view of the clamp device of FIG. 17, constructed in accordance with the present disclosure.

FIGS. 17 and 18 illustrate an additional example clamp device constructed in accordance with the present disclosure. While the example clamp device 700 illustrated in FIGS. 17 and 18 looks substantially similar to the other example clamp devices disclosed herein, the most notable difference between the example clamp device 700 and the other example clamp devices disclosed herein is the material with which the clamp device 700 is made. In particular, the clamp device may be made of an elastomeric material such as, for example, a soft plastic or polymer. Accordingly, the difference in material necessitates a slightly different structure of the clamp device while the functionality remains substantially similar to the other example clamp devices disclosed herein.

The example clamp device 700 illustrated in FIGS. 17 and 18 is constructed in accordance with the teachings of the present disclosure. The clamp device 700 of FIGS. 17 and 18 is similar to the clamp device of FIG. 3, except for variations in the outer and inner sleeves 704, 708. Thus, for ease of reference, and to the extent possible, the same or similar components of the clamp device 700 will retain the same reference numbers as outlined above with respect to clamp device 100, although the reference numbers will be increased by 600.

Similar to the clamp device 100 of FIG. 3, the clamp device 700 has an outer sleeve 704 having a generally annular body that includes an outer circumferential surface 712 and an inner circumferential surface 716 that is opposite of the outer circumferential surface 712. The outer circumferential surface 712 of the outer sleeve 704 includes a grip 720 disposed centrally on the outer sleeve 704. Like the inner circumferential surface 116 of the outer sleeve 104, the inner circumferential surface 716 of the outer sleeve 704 defines a plurality of ramped surfaces 710 extending from respective ends of the outer sleeve 704 that form a concave cross-sectional shape of the inner circumferential surface 716 of the outer sleeve 704. Additionally, the outer surface 704 includes angled surfaces 742, 746 (which can also be referred to as first and second seats 742, 746) disposed near the inner circumferential surface 716 of the outer sleeve 704. In particular, the example angled surfaces 742, 746 illustrated in FIG. 18 create a surface that exerts a force normal to either a detent (not illustrated) in the inner sleeve 708 or a stopper 760 of the inner sleeve 708.

Moreover, like the inner sleeve 108 of FIG. 4, the inner sleeve 708 of FIGS. 17 and 18 includes the stopper 760 disposed at a first end 764 of the inner sleeve 708, and the ring (not illustrated) disposed in a channel 772 at a second end 776 of the inner sleeve 708 that is opposite the first end 764. However, unlike the inner sleeve 108 of FIG. 4, the inner sleeve 708 of FIGS. 17 and 18 includes another example of rigid members 780 that are different from the rigid members 180 of FIG. 4. In particular, the example rigid members 780 of FIGS. 17 and 18 can be tabs that flex radially inward as a result of a compressive force exerted by the outer sleeve 704.

Figure 19:
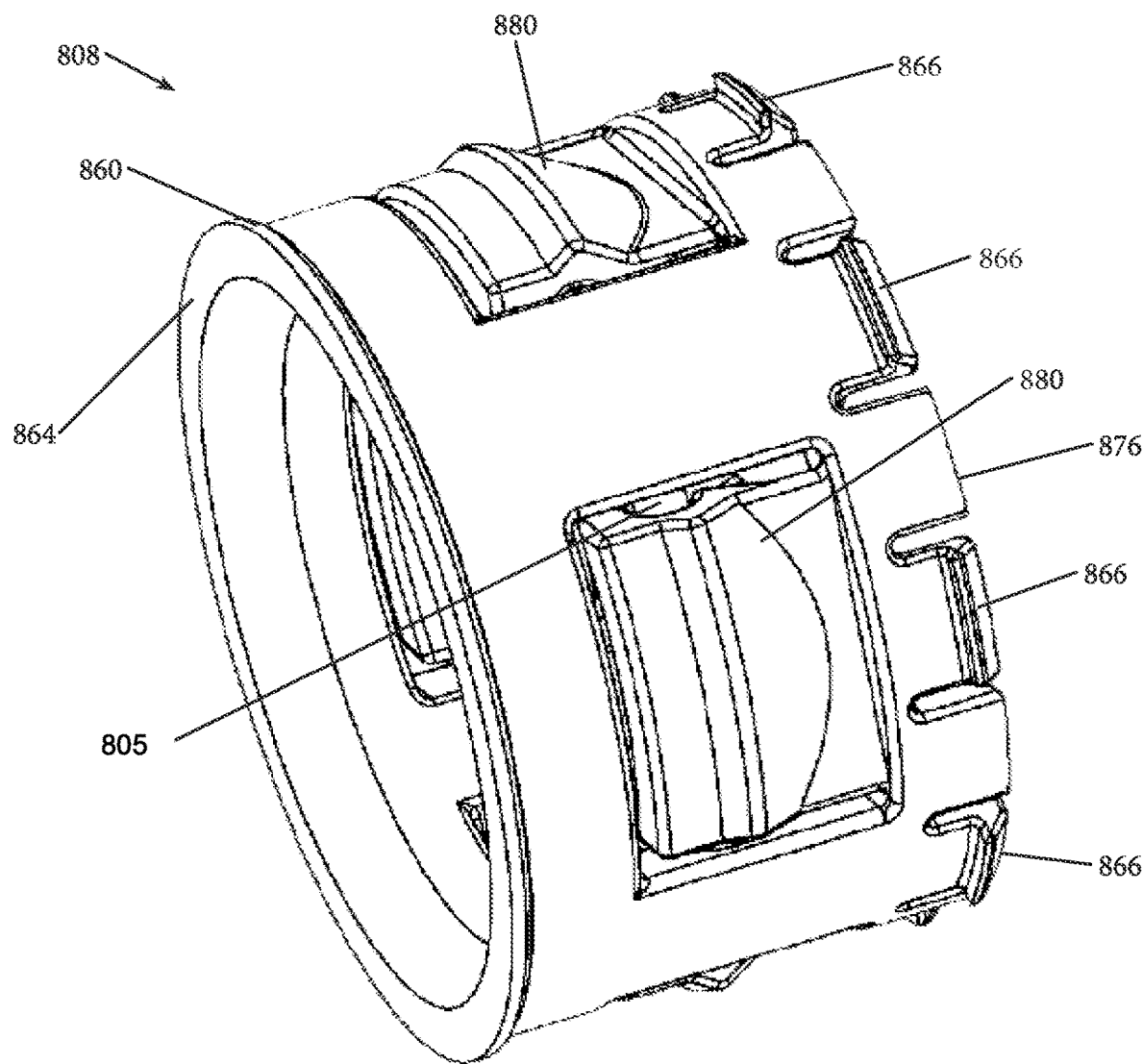
FIG. 19 illustrates a perspective view of an embodiment of an inner sleeve for a clamp device, constructed in accordance with the present disclosure.
Figure 20:
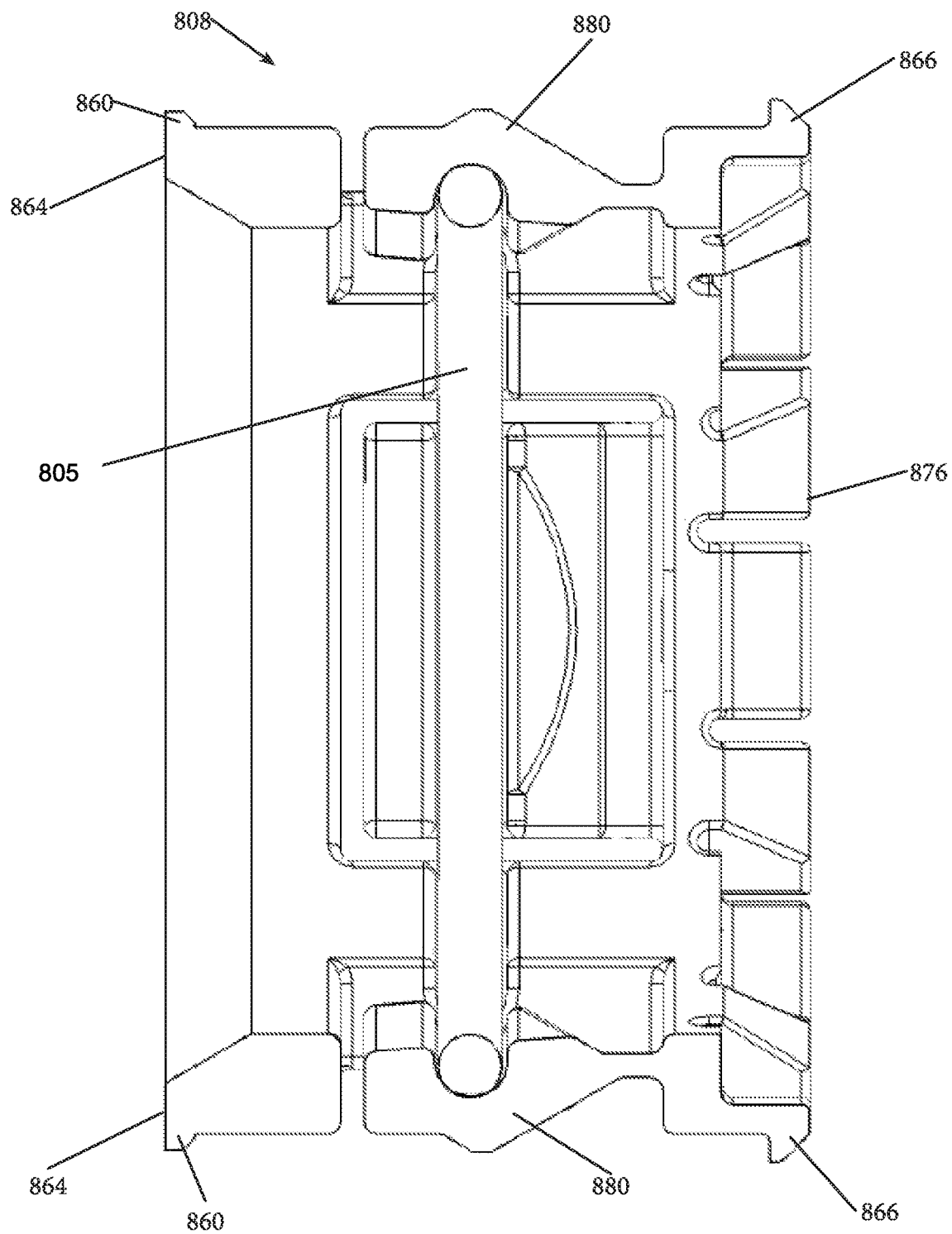
FIG. 20 illustrates a cross-sectional view of the inner sleeve of FIG. 19, constructed in accordance with the present disclosure.

Additionally, FIGS. 19 and 20 illustrate an inner sleeve 808 that is constructed in accordance with the teachings of the present disclosure. The inner sleeve 808 of FIGS. 19 and 20 is similar to the inner sleeve 708 of FIGS. 17 and 18, except the inner sleeve 808 further includes at least one barb 866. Thus, for ease of reference, and to the extent possible, the same or similar components of the inner sleeve 808 will retain the same reference numbers as outlined above with respect to inner sleeve 708, although the reference numbers will be increased by 100.

Similar to the inner sleeve 708 of FIGS. 17 and 18, the inner sleeve 808 of FIGS. 19 and 20 includes a stopper 860 disposed at a first end 864 of the inner sleeve 808 and a plurality of tabs 880. However, the inner sleeve 808 of FIGS. 19 and 20 differs in that, disposed at a second end 876 of the inner sleeve 808, is a set of one-way barbs 866. In function, the one-way barbs 866 are similar to the ring 168 disposed in the channel 172 of the inner sleeve 108 of FIG. 4, in that the one-way barbs 866 assist in the assembly of the clamp device 800 by providing a side where an outer sleeve can be slid over the inner sleeve 808. However, the one-way barbs 866 differ from the ring 168 of FIG. 4 in that to remove an outer sleeve from the inner sleeve 808, each of the one-way barbs 866 may need to be depressed to allow the outer sleeve to be removed from the inner sleeve 808. As best illustrated in FIG. 20, the inner sleeve 808 includes a resilient ring 805 similar to the resilient ring 305 of FIG. 6. The resilient ring 805 makes contact with the bar and slides against the bar allowing the clamp device to slide smoothly against the bar. Additionally, the resilient ring 805 may provide an additional seal when the clamp device is in the secured position. Furthermore, the inner sleeve 808 may be made of a hard plastic or polymer.

Figure 21:
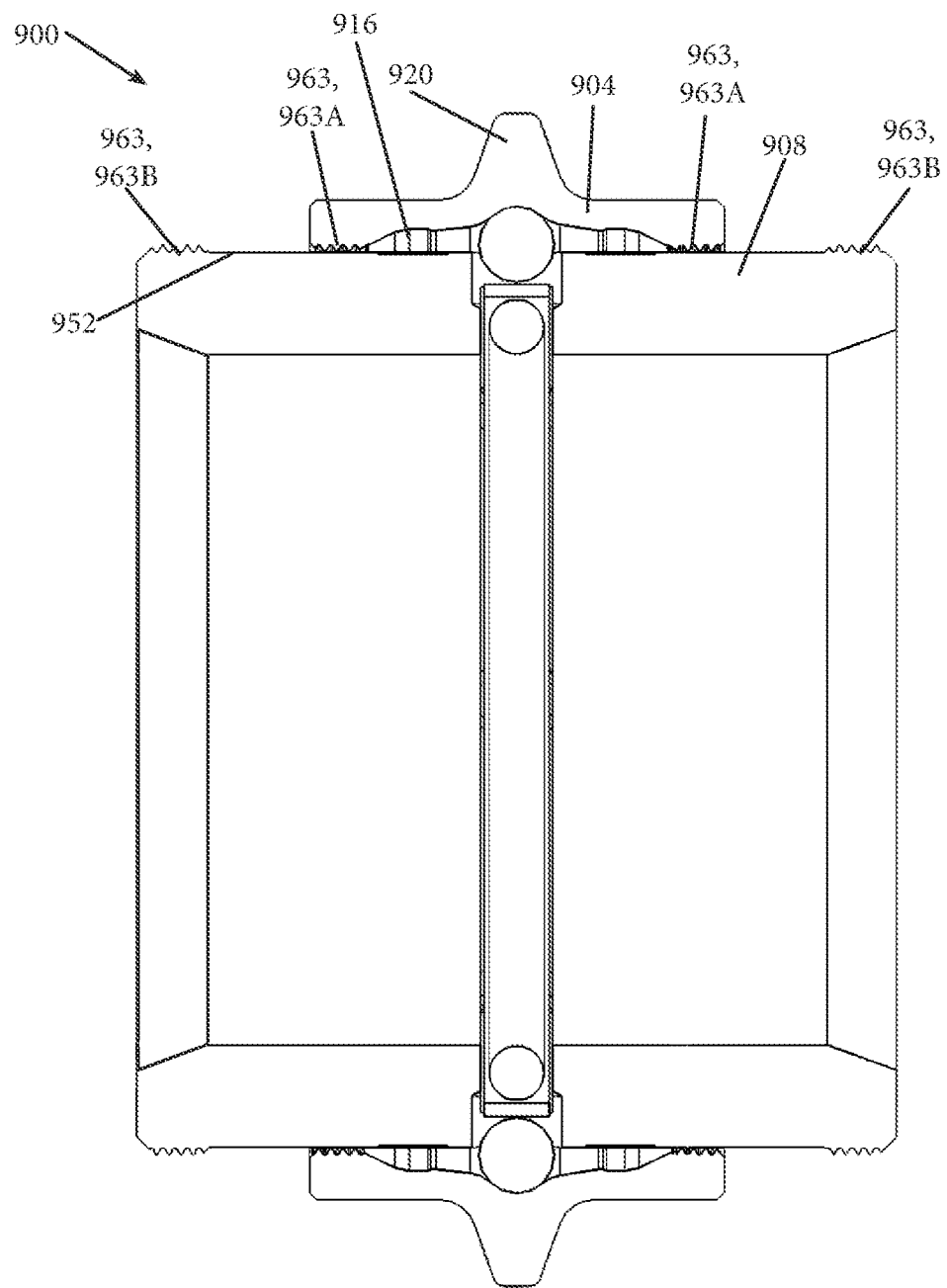
FIG. 21 illustrates a cross-sectional view of an embodiment of a clamp device, constructed in accordance with the present disclosure.

As illustrated in FIG. 21, some example clamp devices 900 can include a threaded portion 963 for further securing the outer sleeve 904 to the inner sleeve 908 in the secured position. In such an example, a portion of the inner circumferential surface 916 of the outer sleeve 904 can include a first set of threads 963A and a portion of the outer circumferential surface 952 of the inner sleeve 908 can include a second set of threads 963B such that the second set of threads 963B is configured to engage the first set of threads 963A. To engage the threaded portion 963A of the outer sleeve 904 with the threaded portion 963B of the inner sleeve 908, the outer sleeve 904 is axially translated toward the end of the inner sleeve 908 having the threaded portion 963B. Once a force is exerted on the grip 920 and the threaded portion 963A of the outer sleeve 904 reaches the threaded portion 963B of the inner sleeve 908, the outer sleeve 904 is rotated into a third position where the threaded portion 963A of the outer sleeve 904 engages the threaded portion 963B of the inner sleeve 908. Once rotated sufficiently, the outer sleeve 904 will exert a further force on the inner sleeve 908 thereby providing an even stronger sealing force.

Figure 22:
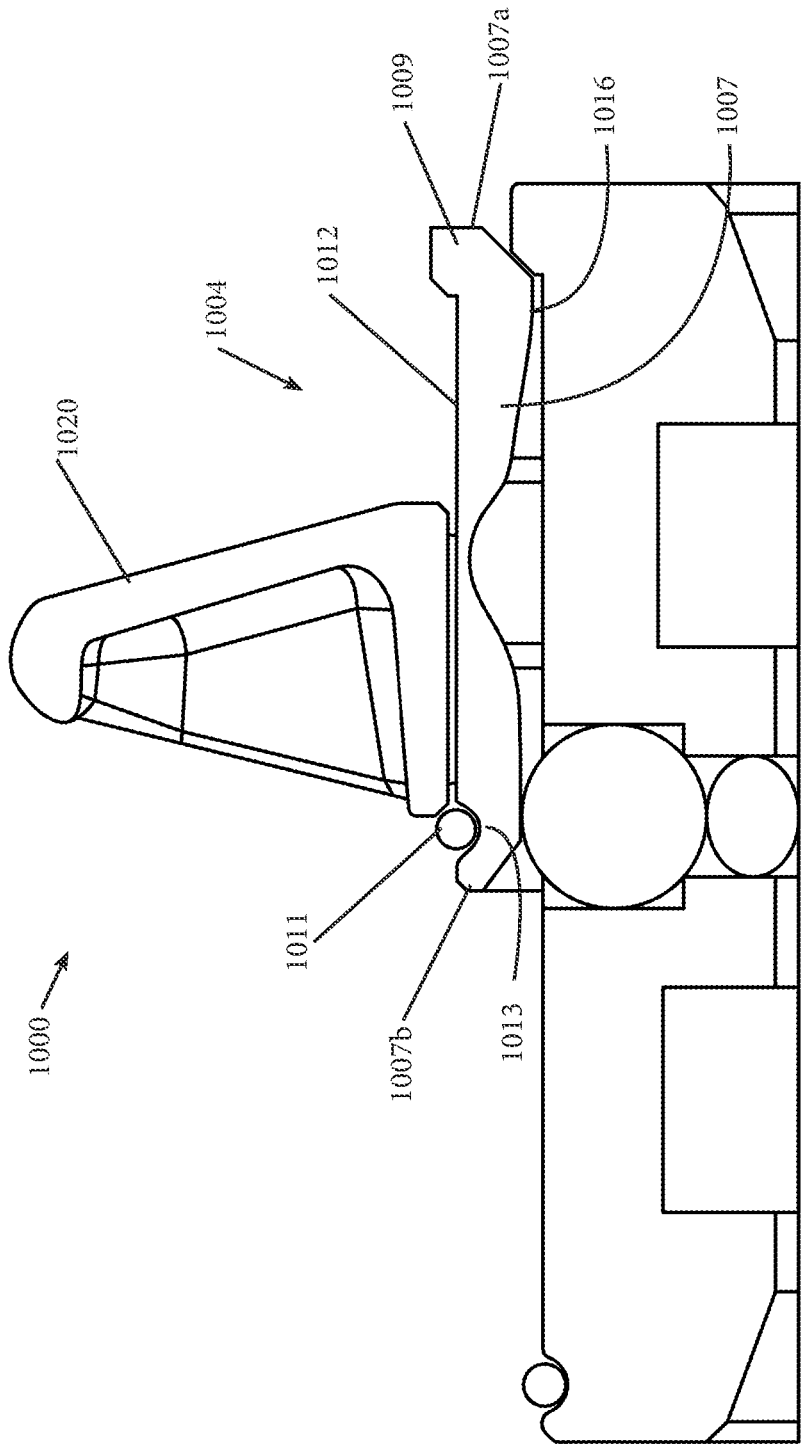
FIG. 22 illustrates a cross-sectional view of an embodiment of a clamp device in a first configuration, constructed in accordance with the present disclosure.
Figure 23:
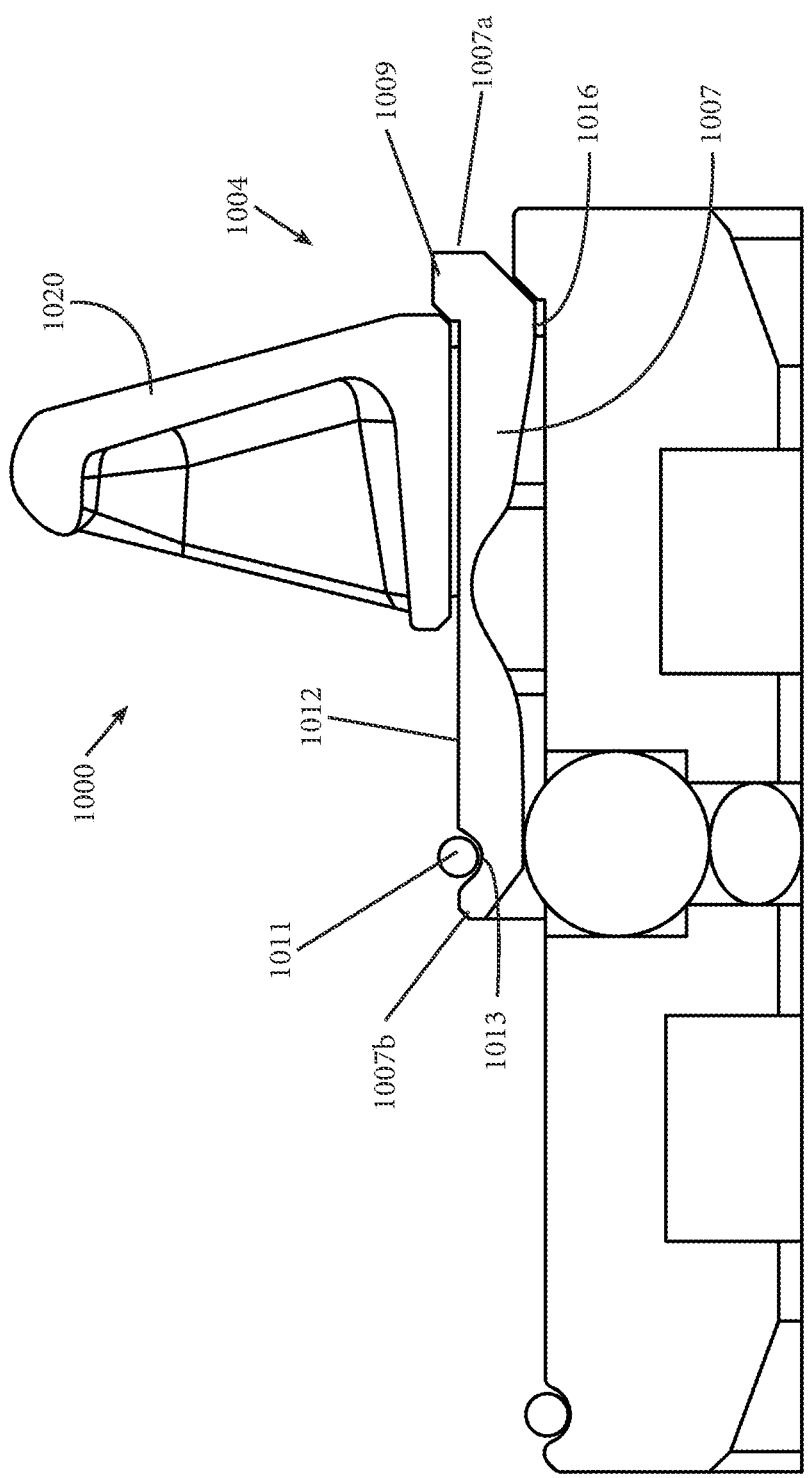
FIG. 23 illustrates a cross-sectional view of the clamp device of FIG. 22 in a second configuration, constructed in accordance with the present disclosure.

FIGS. 22 and 23 illustrate an example clamping device 1000 in a first configuration and a second configuration, respectively. The clamping device 1000 of FIGS. 22 and 23 is similar to the clamping device 100 of FIG. 3, but includes another example of an outer sleeve 1004 that is different from the outer sleeve 104 illustrated in FIG. 3. The outer sleeve 1004 of FIGS. 22 and 23 is similar to the outer sleeve 104 of FIG. 3 in that the outer sleeve 1004 includes a generally annular body having an outer circumferential surface 1012, an inner circumferential surface 1016, and a grip 1020. However, unlike the grip 120 of the outer sleeve 104 of FIG. 3, the grip 1020 of the outer sleeve 1004 of FIGS. 22 and 23 is slidably disposed on a base 1007 of the outer sleeve 1004. In other words, the grip 1020 is separated from the base 1007 thereby allowing the grip 1020 to translate relative to the base 1007.

The base 1007 also includes a base stopper 1009 disposed at a first end 1007a of the base 1007 and a base ring 1011 disposed at a second end 1007b of the base 1007. The base ring 1011 is disposed in a base channel 1013 located at the second end 1007b of the base 1007. As illustrated in FIGS. 22 and 23, the base channel 1013 is an annular channel, groove, or recess that extends around the circumference of the base 1007. The base channel 1013 also has a depth such that a portion of the base ring 1011 extends past the outer circumferential surface 1012 of the base 1007. Additionally, the base channel 1013 has an arcuate or semi-circular cross-section that compliments the circular cross-section of the base ring 1011. The complimentary shape of the base channel 1013 ensures that the base ring 1011 sits securely within the base channel 1013 and does not come out of the base channel 1013 in response to being exposed to an external force (e.g., the grip 1020 pressing against the base ring 1011 during operation). The base stopper 1009 and the base ring 1011, similar to the stopper 160 and the ring 168 of the inner sleeve 108 of FIG. 4, act to retain the grip 1020 within a perimeter of the outer sleeve 1004.

With the base ring 1011 and the base stopper 1009 retaining the grip 1020 within a perimeter of the base 1007, 1007 such that the grip 1007 can translate relative to the base 1007 between the base ring 1011 and the base stopper 1009. So configured, a user can translate the grip 1020 from the first configuration illustrated in FIG. 22 to the second configuration illustrated in FIG. 23 when securing the clamp device 1000, as discussed extensively above. Alternatively, the user can translate the grip 1020 from the second configuration illustrated in FIG. 23 to the first configuration illustrated in FIG. 22 when releasing the clamp device 1000. The additional space in which the user can translate the grip 1020 creates momentum and allows the user to release or secure the clamp device 1000 with less force.

Figure 24:
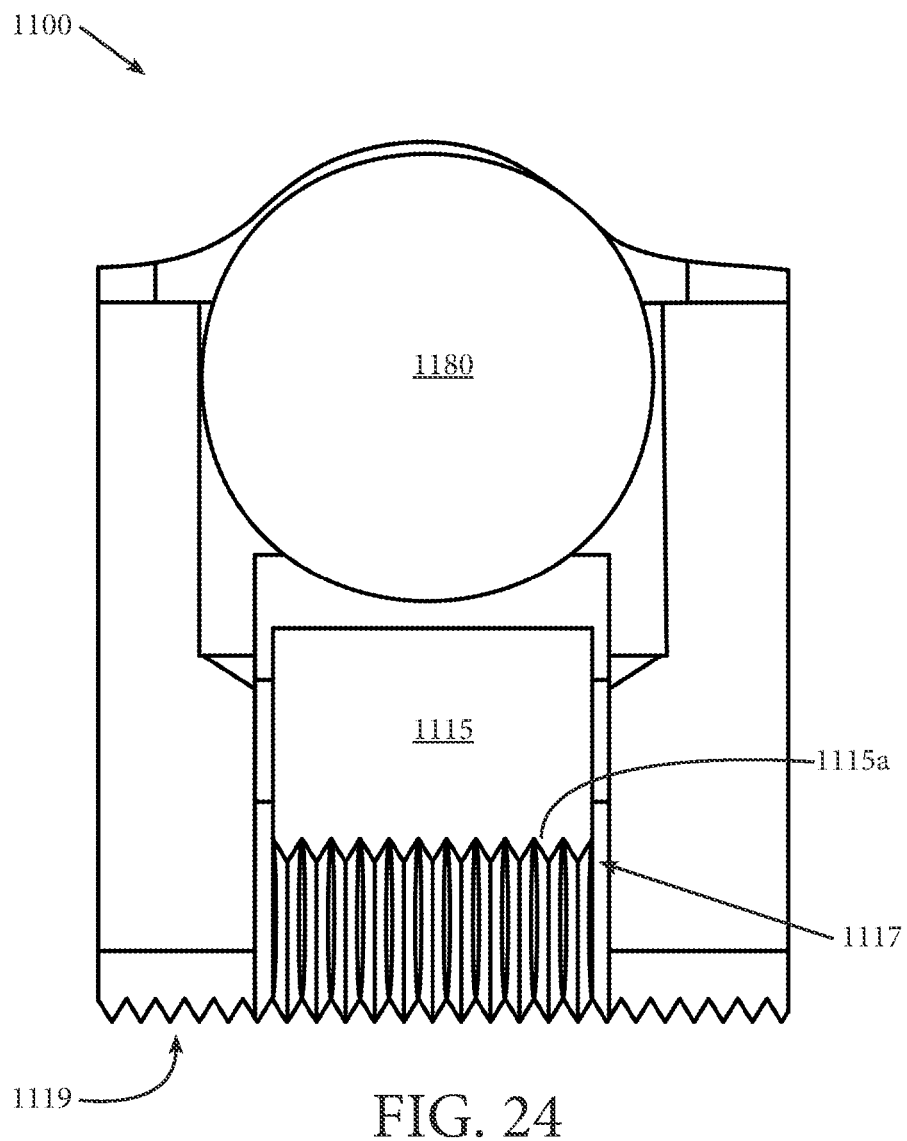
FIG. 24 illustrates a cross-sectional view of an embodiment of a clamp device in a first configuration, constructed in accordance with the present disclosure.
Figure 25:
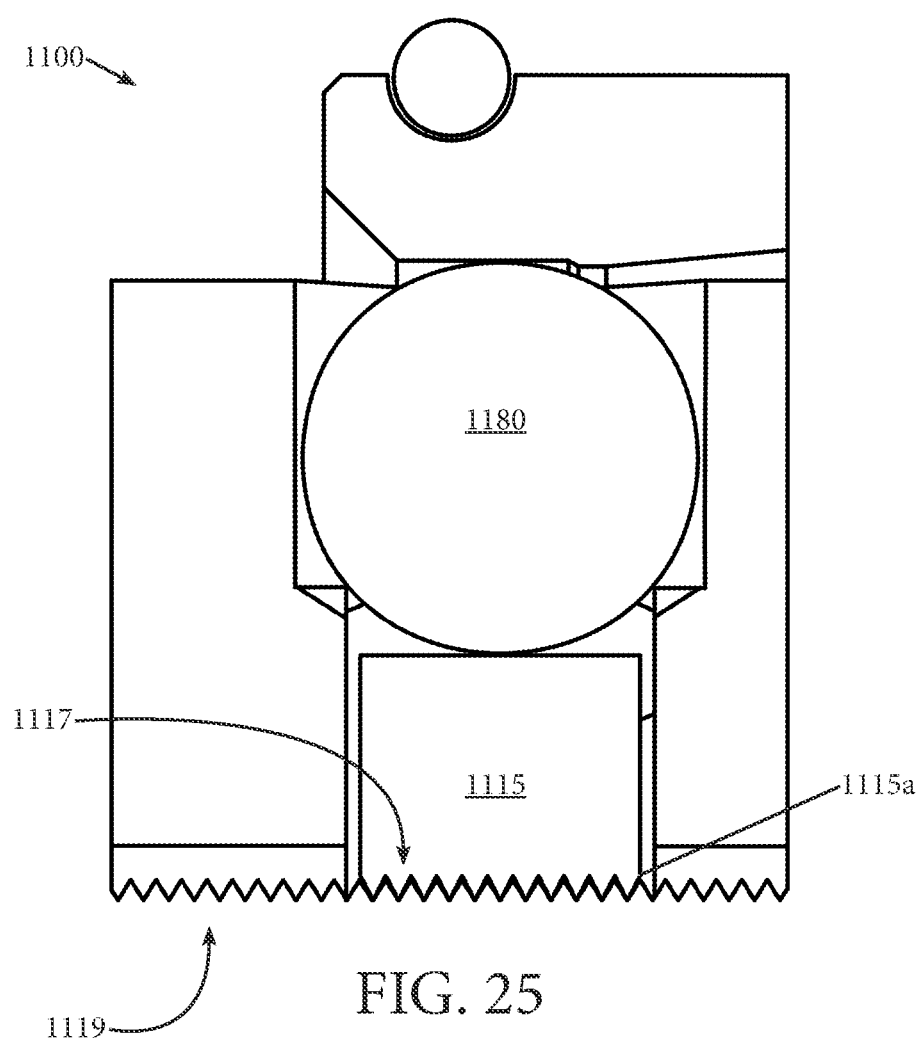
FIG. 25 illustrates a cross-sectional view of the clamp device of FIG. 24 in a second configuration, constructed in accordance with the present disclosure.

Turning now to FIGS. 24 and 25, which illustrate a cross-sectional view of a portion of another example clamp device 1100 in a first configuration and a second configuration, respectively. The clamp device 1100 of FIGS. 24 and 25 is similar to the clamp device 100 of FIG. 3, but includes a serrated ring 1115 in place of the resilient ring 305, 405, 505, 605, 805. The serrated ring 1115 is similar to the resilient ring 305, 405, 505, 605, 805 in that the serrated ring 1115 secures the clamp device 1100 to the bar. However, unlike the resilient ring 305, 405, 505, 605, 805 the serrated ring 1115 includes a plurality of teeth 1117 disposed on an inner surface 1115a of the serrated ring 1115 that is configured to securely engage a plurality of threads 1119 disposed along the bar, as illustrated in FIG. 25. The serrated ring 1115 is also discontinuous in that the serrated ring does not have a continuous body. Rather, the serrated ring 1115 extends circumferentially from a first end to a second end such that a gap is disposed between the first and second ends. So configured, when the rigid ring 1180 translates radially inward toward the bar the rigid ring 1180 brings the plurality of teeth 1117 on the serrated ring 1115 into engagement with the plurality of threads 1119 disposed along the bar. Accordingly, the plurality of teeth 1117 may have different configurations depending on the orientation and configuration of the plurality of threads 1119 disposed on the bar.

While the aforementioned clamp devices have been described as being used with a bar and weights, it is envisioned that the disclosed clamp device can be used for purposes other than securing weights to a bar. For example, the clamp device can include a closed end rather than having two open ends, in some examples. In such an example, the clamp device can be secured to a pipe or tube as discussed extensively above and be used during low pressure or vacuum leak testing. In other examples, the clamp device can be used to repair leaking pipes or connect two pipes. In such examples, the clamp device can include a plurality of outer sleeves that are received by the inner sleeve. So configured, the clamp device can be placed on the portion of the pipe that is leaking and once the plurality of outer sleeves are slidably translated toward respective ends of the inner sleeve, the clamp device would be sealed on either side thereby stopping the leak.

Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

I claim:

1. A clamp device for being secured to a bar, the clamp device comprising:
   an outer sleeve comprising a generally annular body having an outer circumferential surface and an inner circumferential surface, the inner circumferential surface defining an annular recess;
   an inner sleeve received by the outer sleeve, the inner sleeve comprising a generally annular body having an outer circumferential surface, an inner circumferential surface, and a channel extending through the inner sleeve between the outer circumferential surface and the inner circumferential surface;
   a resilient ring disposed within the channel adjacent to the inner circumferential surface of the inner sleeve; and
   at least one rigid member disposed within the channel adjacent to the outer circumferential surface of the inner sleeve;
   wherein, the outer sleeve is axially movable relative to the inner sleeve between:
   (a) a first position wherein the annular recess of the outer sleeve is axially aligned with the channel of the inner sleeve and the at least one rigid member is disposed in the annular recess of the outer sleeve, and
   (b) a second position wherein the annular recess of the outer sleeve is axially displaced from the channel in the inner sleeve such that the inner circumferential surface of the outer sleeve displaces the at least one rigid member in a radial direction away from the outer sleeve to urge at least a portion of the resilient ring toward the inner circumferential surface of the inner sleeve such that when the clamp device is positioned on a bar, the bar resides within an opening defined by the inner circumferential surface of the inner sleeve such that the outer sleeve and the at least one rigid member compress the resilient ring against the bar to secure the clamp device in place.

2. The clamp device of claim 1, further comprising a rigid ring disposed between the at least one rigid member and the resilient ring, the rigid ring configured to equally distribute the force of the at least one rigid member to the resilient ring.

3. The clamp device of claim 1, wherein the inner circumferential surface of the outer sleeve further defines one ramped surface or a plurality of ramped surfaces.

4. The clamp device of claim 3, wherein each ramped surface of the plurality of ramped surfaces extends from an end of the outer sleeve toward the annular recess.

5. The clamp device of claim 1, wherein the inner sleeve further comprises a first stopper disposed at a first end of the inner sleeve and a second stopper disposed at a second end of the inner sleeve.

6. The clamp device of claim 1, wherein the outer circumferential surface of the inner sleeve defines at least one additional channel, each channel of the at least one additional channel being adapted to receive a detent.

7. The clamp device of claim 1, wherein a portion of the inner circumferential surface of the outer sleeve comprises a first set of threads and a portion of the outer circumferential surface of the inner sleeve comprise a second set of threads, the second set of threads configured to engage the first set of threads.

8. The clamp device of claim 1, wherein the at least one rigid member comprises: a ball, a pin, a ring, a tab, a cam, or a clip.

9. A clamp device for being secured to a bar, the clamp device comprising:
- an outer sleeve comprising a generally annular body having an outer circumferential surface and an inner circumferential surface, the inner circumferential surface defining an annular recess, a first ramped surface continuously extending from a first end of the outer sleeve toward the annular recess, and a second ramped surface continuously extending from a second end of the outer sleeve toward the annular recess;
- an inner sleeve received by the outer sleeve, the inner sleeve comprising a generally annular body having an outer circumferential surface and an inner circumferential surface, the inner circumferential surface having a first channel and a second channel;
- a resilient ring disposed in the first channel; and
- at least one rigid member disposed in the second channel;
- wherein, the outer sleeve is axially movable relative to the inner sleeve between:
  (a) a first position, wherein the annular recess of the outer sleeve is axially aligned with the first and second channels, and
  (b) a second position, wherein the annular recess of the outer sleeve is axially displaced from the first and second channels in the inner sleeve such that the inner circumferential surface of the outer sleeve displaces the at least one rigid member in a radial direction away from the outer sleeve to urge at least a portion of the resilient ring toward the inner circumferential surface of the inner sleeve, such that when the clamp device is positioned on a bar, the bar resides within an opening defined by the inner circumferential surface of the inner sleeve such that the outer sleeve and the at least one rigid member compress the resilient ring against the bar to secure the clamp device in place.

10. The clamp device of claim 9, further comprising a rigid ring disposed between the at least one rigid member and the resilient ring such that the rigid ring is configured to evenly distribute the force of the at least one rigid member onto the resilient ring.

11. The clamp device of claim 9, wherein the inner sleeve comprises a first stopper disposed proximate a first end of the inner sleeve and a second stopper disposed proximate a second end of the inner sleeve, the second end being opposite the first end.

12. The clamp device of claim 9, wherein the outer circumferential surface of the inner sleeve further defines at least one additional groove, each groove of the at least one groove being adapted to receive a detent.

13. The clamp device of claim 9, wherein the first channel is disposed proximate the inner circumferential surface of the inner sleeve and the second channel is disposed proximate the outer circumferential surface of the inner sleeve.

14. The clamp device of claim 11, wherein at least one of the first stopper and the second stopper comprises a tab or a barb.

15. The clamp device of claim 9, wherein a portion of the inner circumferential surface of the outer sleeve comprises a first set of threads and a portion of the outer circumferential surface of the inner sleeve comprise a second set of threads, the second set of threads configured to engage the first set of threads.

16. The clamp device of claim 9, wherein the at least one rigid member comprises: a ball, a pin, a ring, a tab, a cam, or a clip.

17. A clamp device for being secured to a bar, the clamp device comprising:
- an outer sleeve comprising a generally annular body having an outer circumferential surface and an arcuate inner circumferential surface;
- an inner sleeve adapted to be received by the outer sleeve, the inner sleeve comprising a generally annular body having a plurality of tabs disposed circumferentially around the inner sleeve, each tab in the plurality of tabs having a channel disposed on an inner surface of the tab; and
- a resilient ring disposed within the channel of each tab in the plurality of tabs;
- wherein the outer sleeve is axially movable relative to the inner sleeve between:
  (a) a first position, wherein each tab in the plurality of tabs is disposed at a crest of the arcuate inner circumferential surface; and
  (b) a second position, wherein each tab in the plurality of tabs is disposed proximate a first end of the outer sleeve or a second end of the outer sleeve.

18. The clamp device of claim 17, wherein each tab in the plurality of tabs comprises a cam configured to slidably translate along the arcuate inner circumferential surface of the outer sleeve.

19. The clamp device of claim 17, wherein the inner circumferential surface of the outer sleeve further comprises a first seat disposed at the first end of the outer sleeve and a second seat disposed at the second end of the outer sleeve, the first and second seats configured to receive the plurality of tabs.

20. The clamp device of claim 17, wherein the inner sleeve further comprises a first stopper disposed at a first end of the inner sleeve and a second stopper disposed at a second end of the inner sleeve.

* * * * *